(12) United States Patent
Yoshikawa et al.

(10) Patent No.: US 12,724,424 B2
(45) Date of Patent: Sep. 1, 2026

(54) WORKING ROBOT

(71) Applicant: MAKITA CORPORATION, Anjo (JP)

(72) Inventors: Tatsuya Yoshikawa, Anjo (JP); Hirokatsu Yamamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 26 days.

(21) Appl. No.: 18/907,994

(22) Filed: Oct. 7, 2024

(65) Prior Publication Data

US 2025/0117019 A1 Apr. 10, 2025

(30) Foreign Application Priority Data

Oct. 10, 2023 (JP) ................................ 2023-175390

(51) Int. Cl.
*G05D 1/435* (2024.01)

(52) U.S. Cl.
CPC .................................. *G05D 1/435* (2024.01)

(58) Field of Classification Search
CPC ....... G05D 1/435; A01D 34/74; A01D 34/008
See application file for complete search history.

(56) References Cited

U.S. PATENT DOCUMENTS

2017/0280623 A1* 10/2017 Yamamura ........... A01D 34/008
2018/0253096 A1* 9/2018 Holgersson .......... G05D 1/0274

FOREIGN PATENT DOCUMENTS

JP WO2017/051663 A1 1/2018

* cited by examiner

*Primary Examiner* — Dylan M Katz
(74) *Attorney, Agent, or Firm* — Oliff PLC

(57) ABSTRACT

A working robot may include a robot body, a movement unit, a working unit supported by the robot body, a height adjustment unit configured to change a height level of the working unit relative to the robot body, and a control unit. The control unit may be configured to execute an autonomous operation including a working process of causing the working unit to work while moving the robot body by the movement unit and a height adjustment process of causing the height adjustment unit to adjust the height level of the working unit relative to the robot body in multiple steps. The working robot may be configured to be switched between a first state in which the control unit executes the height adjustment process in the autonomous operation and a second state in which the control unit does not execute the height adjustment process in the autonomous operation.

20 Claims, 12 Drawing Sheets

2
4(28)
G
42R
40R
40L
42L
UP
DOWN
LEFT
RIGHT

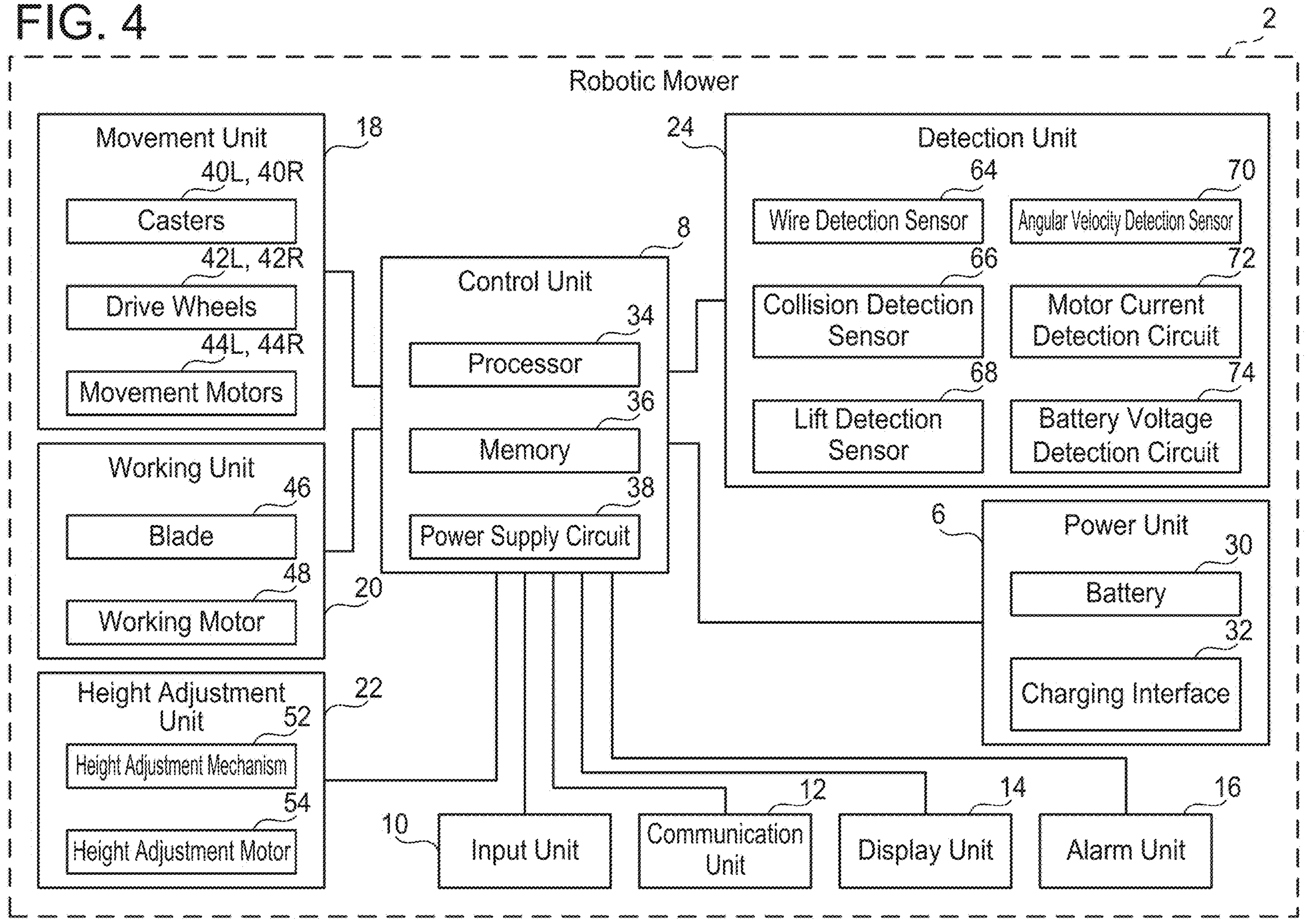
FIG. 4
2
Robotic Mower
Movement Unit
18
40L, 40R
Casters
42L, 42R
Drive Wheels
44L, 44R
Movement Motors
Working Unit
46
Blade
48
Working Motor
20
Height Adjustment Unit
22
52
Height Adjustment Mechanism
54
Height Adjustment Motor
8
Control Unit
34
Processor
36
Memory
38
Power Supply Circuit
24
Detection Unit
64
Wire Detection Sensor
70
Angular Velocity Detection Sensor
66
Collision Detection Sensor
72
Motor Current Detection Circuit
68
Lift Detection Sensor
74
Battery Voltage Detection Circuit
6
Power Unit
30
Battery
32
Charging Interface
10
Input Unit
12
Communication Unit
14
Display Unit
16
Alarm Unit

| Working Field Area ($m^2$) | First Working Duration Threshold (h) |
|---|---|
| 0~500 | 10 |
| 500~1000 | 20 |
| 1000~2000 | 40 |
| 2000~3500 | 80 |

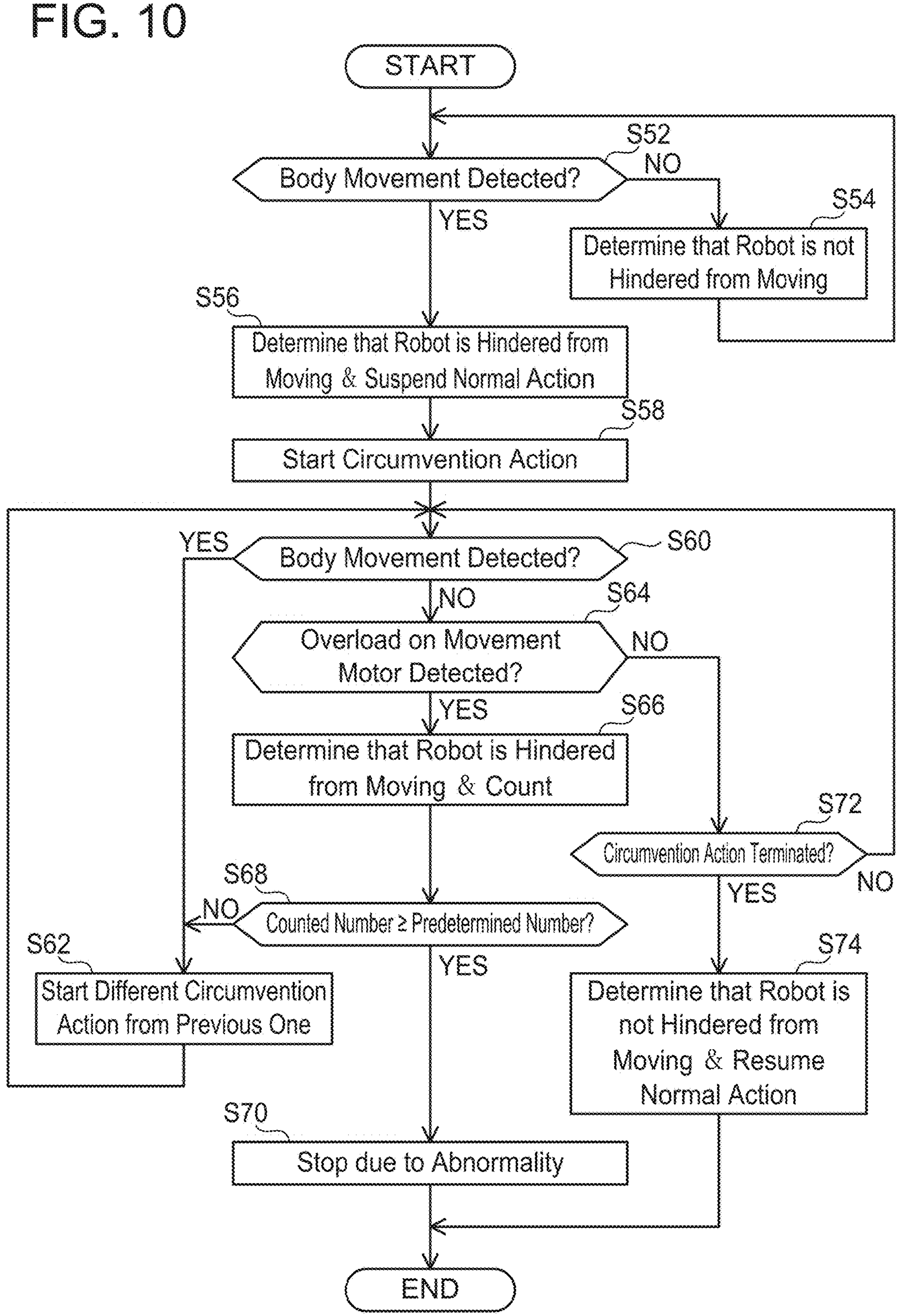
FIG. 10
START
S52
Body Movement Detected?
NO
YES
S54
Determine that Robot is not Hindered from Moving
S56
Determine that Robot is Hindered from Moving & Suspend Normal Action
S58
Start Circumvention Action
YES
Body Movement Detected?
S60
NO
S64
Overload on Movement Motor Detected?
NO
YES
S66
Determine that Robot is Hindered from Moving & Count
S72
Circumvention Action Terminated?
NO
YES
S68
NO
Counted Number ≥ Predetermined Number?
YES
S62
Start Different Circumvention Action from Previous One
S74
Determine that Robot is not Hindered from Moving & Resume Normal Action
S70
Stop due to Abnormality
END

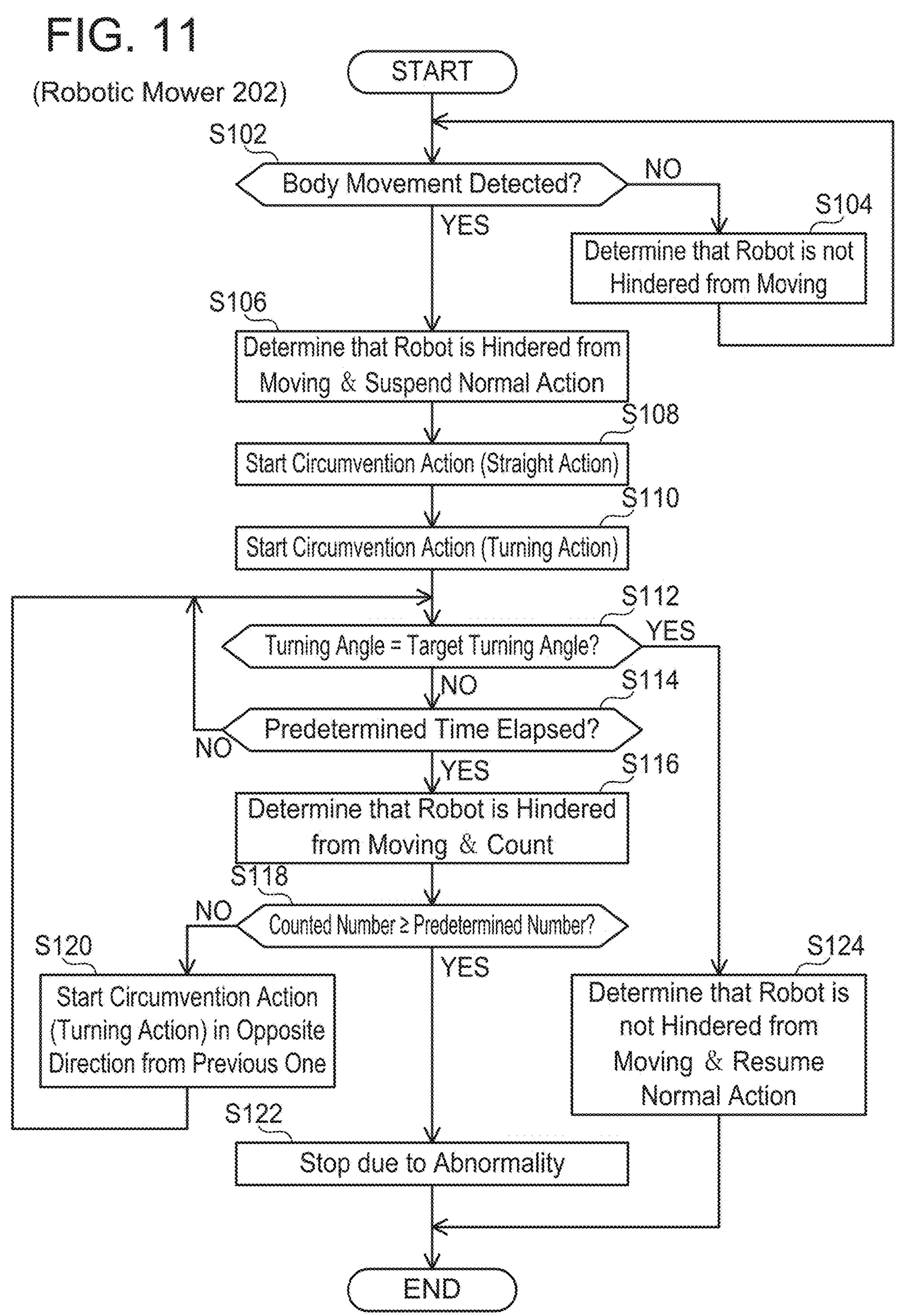
FIG. 11
(Robotic Mower 202)
START
S102
Body Movement Detected?
NO
YES
S104
Determine that Robot is not Hindered from Moving
S106
Determine that Robot is Hindered from Moving & Suspend Normal Action
S108
Start Circumvention Action (Straight Action)
S110
Start Circumvention Action (Turning Action)
S112
Turning Angle = Target Turning Angle?
YES
NO
S114
Predetermined Time Elapsed?
NO
YES
S116
Determine that Robot is Hindered from Moving & Count
S118
Counted Number ≥ Predetermined Number?
NO
YES
S120
Start Circumvention Action (Turning Action) in Opposite Direction from Previous One
S124
Determine that Robot is not Hindered from Moving & Resume Normal Action
S122
Stop due to Abnormality
END

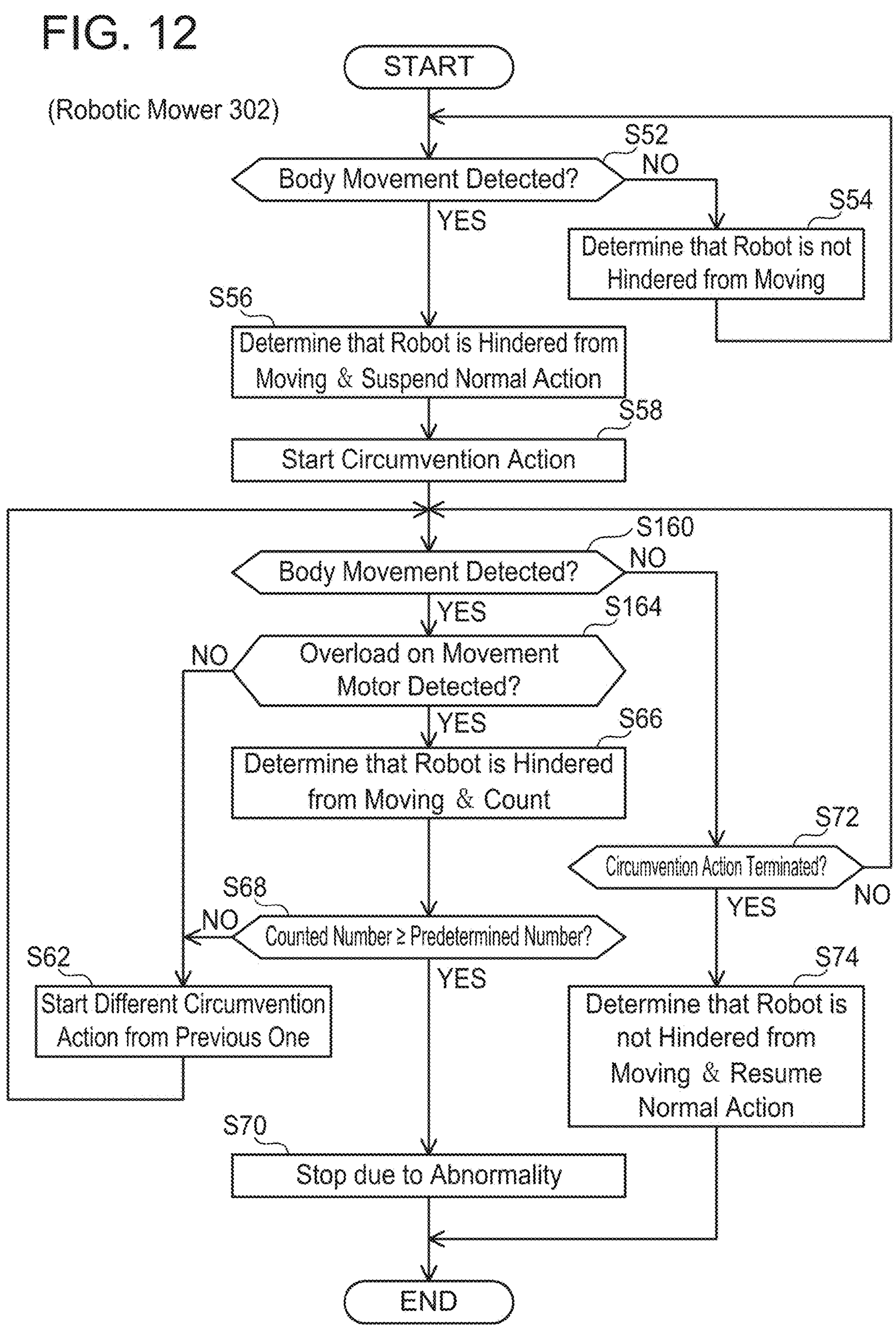
FIG. 12
(Robotic Mower 302)
START
S52
Body Movement Detected?
NO
YES
S54
Determine that Robot is not Hindered from Moving
S56
Determine that Robot is Hindered from Moving & Suspend Normal Action
S58
Start Circumvention Action
S160
Body Movement Detected?
NO
YES
S164
Overload on Movement Motor Detected?
NO
YES
S66
Determine that Robot is Hindered from Moving & Count
S72
Circumvention Action Terminated?
NO
YES
S68
Counted Number ≥ Predetermined Number?
NO
YES
S62
Start Different Circumvention Action from Previous One
S74
Determine that Robot is not Hindered from Moving & Resume Normal Action
S70
Stop due to Abnormality
END

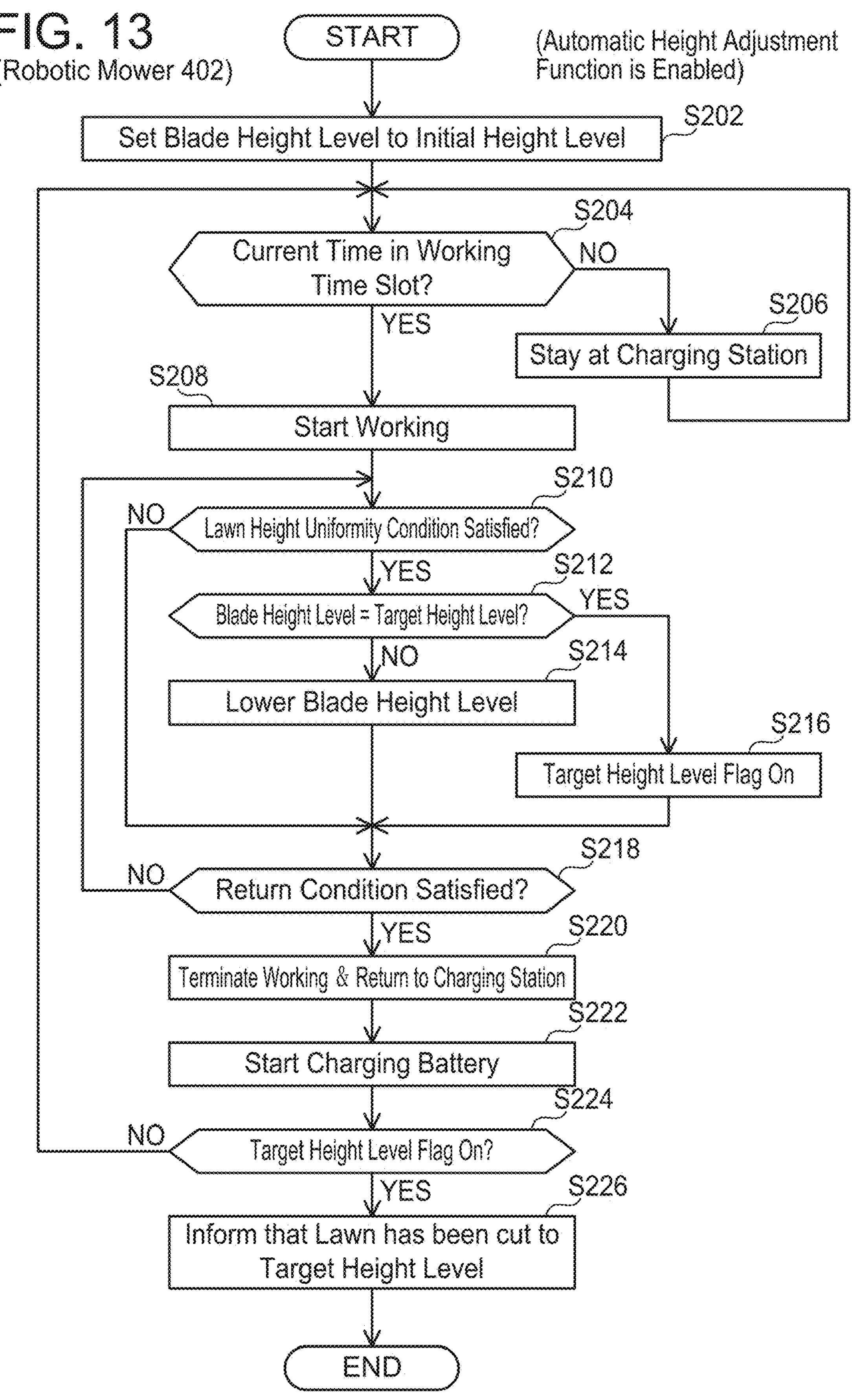
FIG. 13
(Robotic Mower 402)
START
(Automatic Height Adjustment Function is Enabled)
Set Blade Height Level to Initial Height Level
S202
Current Time in Working Time Slot?
S204
NO
YES
S206
Stay at Charging Station
S208
Start Working
S210
NO
Lawn Height Uniformity Condition Satisfied?
YES
S212
YES
Blade Height Level = Target Height Level?
NO
S214
Lower Blade Height Level
S216
Target Height Level Flag On
S218
NO
Return Condition Satisfied?
YES
S220
Terminate Working & Return to Charging Station
S222
Start Charging Battery
S224
NO
Target Height Level Flag On?
YES
S226
Inform that Lawn has been cut to Target Height Level
END

WORKING ROBOT

REFERENCE TO RELATED APPLICATION

This application claims priority to Japanese Patent Application No. 2023-175390 filed on Oct. 10, 2023. The entire content of the priority application is incorporated herein by reference.

TECHNICAL FIELD

Art disclosed herein relates to a working robot.

BACKGROUND ART

Japanese Patent Application Publication No. 2017/051663 describes a working robot including a robot body; a movement unit configured to move the robot body; a working unit supported by the robot body; a height adjustment unit configured to change a height level of the working unit relative to the robot body; and a control unit. The control unit is configured to execute an autonomous operation including a working process of causing the working unit to work while moving the robot body by the movement unit. The height level of the working unit relative to the robot body can be adjusted by a user manually manipulating the height adjustment unit.

SUMMARY

The working robot described in Japanese Patent Application Publication No. 2017/051663 cannot adjust the height level of the working unit during the autonomous operation without a user's manual manipulation to the working robot. This may pose inconveniences, for example, the user has to monitor the progress of work performed by the working robot for adjustment of height level of the working unit. Thus, the working robot has inferior usability. The disclosure herein provides a technology that improves usability of a working robot.

A working robot disclosed herein may comprise a robot body, a movement unit configured to move the robot body, a working unit supported by the robot body, a height adjustment unit configured to change a height level of the working unit relative to the robot body, and a control unit. The control unit may be configured to execute an autonomous operation including a working process of causing the working unit to work while moving the robot body by the movement unit and a height adjustment process of causing the height adjustment unit to adjust the height level of the working unit relative to the robot body in multiple steps. The working robot may be configured to be switched between a first state in which the control unit executes the height adjustment process during the autonomous operation and a second state in which the control unit does not execute the height adjustment process during the autonomous operation.

According to the configuration above, the working robot can adjust the height level of the working unit during the autonomous operation by executing the height adjustment process, without a user's manual manipulation. This improves the usability of the working robot because the user does not have to monitor the progress of work performed by the working robot. However, in some cases, it is desirable not to execute the height adjustment process, such as when the user wishes to keep the height level of the working unit constant throughout the autonomous operation. According to the configuration above, the state of the working robot can be switched between the first state in which the control unit executes the height adjustment process during the autonomous operation and the second state in which the control unit does not execute the height adjustment process during the autonomous operation. This also improves the usability of the working robot because the user can select whether the control unit executes the height adjustment process during the autonomous operation or not.

Another working robot disclosed herein may comprise a robot body, a movement unit configured to move the robot body, a working unit supported by the robot body, a height adjustment unit configured to change a height level of the working unit relative to the robot body, an input unit configured to receive an input from a user, and a control unit. The control unit may be configured to execute an autonomous operation including a working process of causing the working unit to work while moving the robot body by the movement unit and a height adjustment process of causing the height adjustment unit to adjust the height level of the working unit relative to the robot body in multiple steps. The control unit may be configured to execute the height adjustment process based on an input value input to the input unit.

According to the configuration above, the working robot can adjust the height level of the working unit during the autonomous operation by executing the height adjustment process, without a user's manual manipulation. This improves the usability of the working robot because the user does not have to monitor the progress of work performed by the working robot. Further, according to the configuration above, the height adjustment process is executed based on the input value input by the user to the input unit. This also improves the usability of the working robot because the height adjustment process can be executed appropriately in accordance with an environment in which the user uses the working robot or the work to be performed by the working robot.

BRIEF DESCRIPTION OF DRAWINGS

FIG. 4 schematically shows a configuration of the robotic mower 2 according to the first embodiment.

FIG. 8 schematically shows a threshold table TT stored in a memory 36 of the control unit 8 of the robotic mower 2 according to the first embodiment.

FIG. 10 shows a flowchart of a process executed by the control unit 8 while the robotic mower 2 according to the first embodiment is in autonomous operation.

FIG. 11 shows a flowchart of a process executed by a control unit 8 while a robotic mower 202 according to a second embodiment is in autonomous operation.

FIG. 12 shows a flowchart of a process executed by a control unit 8 while a robotic mower 302 according to a third embodiment is in autonomous operation.

FIG. 13 shows a flowchart of an autonomous operation executed by a control unit 8 of a robotic mower 402 according to a fourth embodiment when the automatic height adjustment function is enabled.

DESCRIPTION

Figure 1:
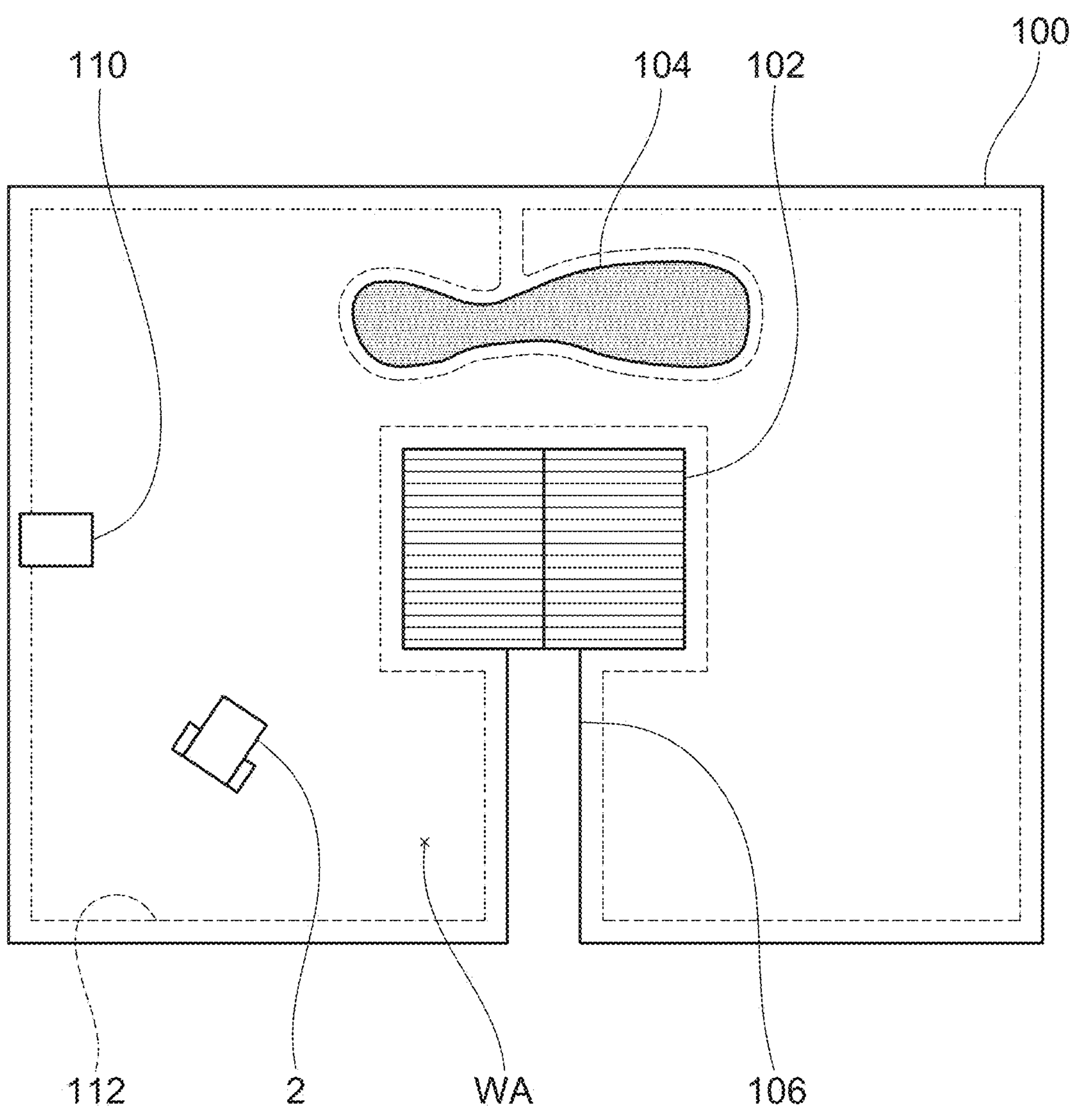
FIG. 1 shows an exemplary use of a robotic mower 2 according to a first embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working robots as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the working robot may further comprise an input unit configured to receive an input from a user. The control unit may be configured to execute the height adjustment process based on an input value input to the input unit.

According to the configuration above, the height adjustment process is executed based on the input value input by the user to the input unit. This also improves the usability of the working robot because the height adjustment process can be executed appropriately in accordance with the environment in which the user uses the working robot or the work to be performed by the working robot.

In one or more embodiments, the height adjustment process may include a first height adjustment process of causing the height adjustment unit to set the height level of the working unit relative to the robot body to an initial height level and a second height adjustment process of causing the height adjustment unit to change the height level of the working unit relative to the robot body from the initial height level to a target height level. The input value may include at least one of the initial height level and the target height level.

Depending on the work performed by the working robot, it may be desirable to determine beforehand a height level of the working unit to be achieved shortly after the start of the autonomous operation and a height level of the working unit to be achieved after a while from the start of the autonomous operation. In the configuration above, the height level of the working unit to be achieved shortly after the start of the autonomous operation (initial height level) and the height level of the working unit to be achieved after a while from the start of the autonomous operation (target height level) can be determined in advance. This improves the usability of the working robot.

In one or more embodiments, the control unit may be configured to execute the second height adjustment process in multiple steps such that the height level of the working unit relative to the robot body is changed in multiple steps from the initial height level to the target height level. Each time a step of the multiple steps of the second height adjustment process is completed, the control unit may execute the working process until a predetermined condition is satisfied and then start a next step of the second height adjustment process.

Depending on the work performed by the working robot, it may be desirable to change the height level of the working unit in multiple steps and cause the working unit to perform the work each time the height level of the working unit is changed. In the configuration above, the height level of the working unit is changed in multiple steps from the initial height level to the target height level and the working unit performs the work each time the height level of the working unit is changed. This improves the usability of the working robot.

In one or more embodiments, in each step of the second height adjustment process, the control unit may cause the height adjustment unit to change the height level of the working unit relative to the robot body by a predetermined distance.

In the configuration above, the height level of the working unit is changed by the same distance in respective steps of the second height adjustment process. This allows a load on the working unit to be maintained constant in the work performed after each time the height level of the working unit is changed.

In one or more embodiments, the control unit may be configured to acquire a working field area. The predetermined condition may include a condition based on the working field area.

According to the configuration above, the predetermined condition (i.e., a termination condition of the working process executed between steps of the second height adjustment process) is based on the working field area. Thus, for example, it is possible to terminate the working process within a short period of time if the working field area is small, or to continue the working process for a long time if the working field area is large. Thus, each time the height level of the working unit is changed, the work can be performed by the working unit in just the right amount for the working field area.

Herein, "working field" means a place where the working robot is used, specifically a place to which the working robot can enter to work therein. Further, "working field area" means the area of working field.

In one or more embodiments, the predetermined condition may include a condition that a duration during which the working unit works after a step of the multiple steps of the second height adjustment process is completed exceeds a working duration threshold determined based on the working field area.

In the configuration above, it is possible to terminate the working process within a short period of time if the working field area is small, or to continue the working process for a long time if the working field area is large. Thus, each time the height level of the working unit is changed, the work can be performed by the working unit in just the right amount for the working field area.

In one or more embodiments, the control unit may store a threshold table in which a duration threshold is assigned to each of a plurality of area ranges. When the control unit acquires the working field area, the control unit may determine, by referring to the threshold table, a duration threshold assigned to the area range in which the working field area is included as the working duration threshold.

In the configuration above, the control unit can determine the duration threshold in a simple manner.

In one or more embodiments, the working unit may comprise a blade configured to mow a lawn. The target height level may be lower than the initial height level. In the second height adjustment process, the control unit may cause the height adjustment unit to lower the height level of the working unit relative to the robot body from the initial height level to the target height level.

According to the configuration above, the working robot serves as a robotic mower. Pieces of lawn cut off by the robotic mower may be used as a mulching material (i.e., grass mulch) spread over the lawn. Smaller cut pieces of lawn are more effective for growth of the lawn because they decompose sooner. In the configuration above, the working robot mows the lawn in multiple steps, and thus the cut pieces of lawn are relatively small in size. Thus, the cut pieces of lawn can effectively enhance the growth of lawn when used as grass mulch.

In one or more embodiments, the input unit may include a body input unit disposed in the robot body.

It is possible to configure the working robot to receive user input only from a communication terminal. However, this may pose inconvenience to the user, if the working robot is near the user but the communication terminal is not when the user needs to input some instructions. According to the configuration above, the body input unit configured to receive user input is disposed in the robot body of the working robot. Thus, even when the communication terminal is not near the user, the user can input to the working robot as long as the working robot is near the user. This prevents the inconvenience to the user.

In one or more embodiments, the working robot may further comprise a rechargeable battery configured to supply power to the working robot. The autonomous operation may further include a charging process of causing the working robot to return to a charging station to recharge the battery. In the height adjustment process, the control unit may cause the height adjustment unit to change the height level of the working unit relative to the robot body when the working robot is located at the charging station, whereas the control unit may not cause the height adjustment unit to change the height level of the working unit relative to the robot body when the working robot is not located at the charging station.

There may be obstacles at places other than where the charging station is located. Thus, if the height level of the working unit is changed when the working robot is not located at the charging station, the working unit may bump an obstacle. According to the configuration above, the height level of the working unit is not changed when the working robot is not located at the charging station, whereas the height level of the working unit is changed only when the working robot is located at the charging station. This prevents the working unit from bumping an obstacle.

First Embodiment: Robotic Mower 2

As shown in FIG. 1, a working robot according to this embodiment is for example a robotic mower 2 used within premises 100 where lawn is growing. Within the premises 100, for example, a house 102, a pond 104, and a path 106 are located. Within the premises 100, a charging station 110 connected to an external power supply (e.g., a commercial power supply) and a wire 112 defining a working region WA for the robotic mower 2 are also located. The working region WA herein is a region surrounded by the wire 112. The robotic mower 2 can detect the position of the wire 112 and autonomously move not to go out of the working region WA in which the robotic mower 2 is present. Thus, the robotic mower 2 can mow the lawn while moving thereon and avoiding the house 102, the pond 104, and the path 106.

Figure 2:
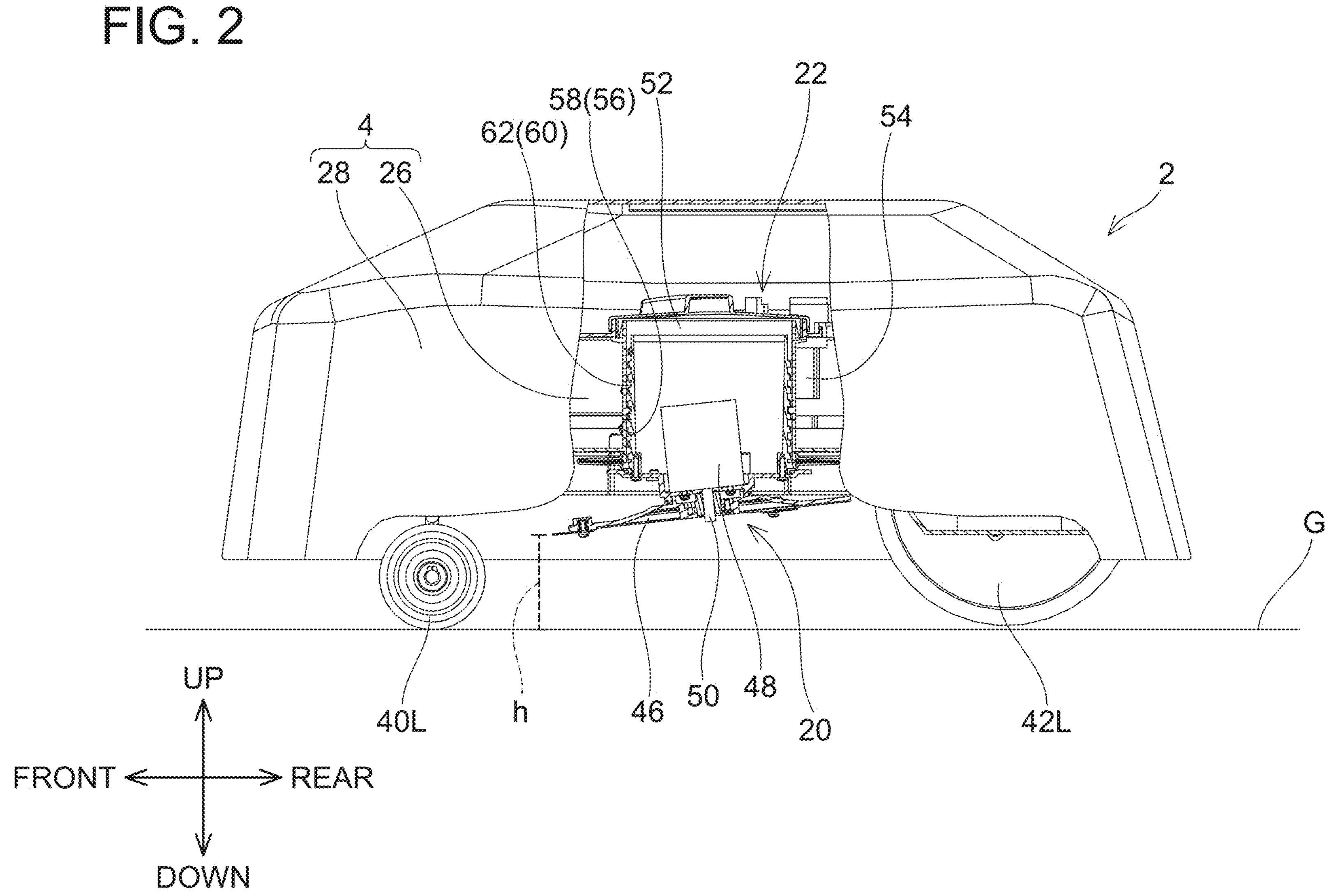
FIG. 2 shows a left side view of the robotic mower 2 according to the first embodiment.
Figure 3:
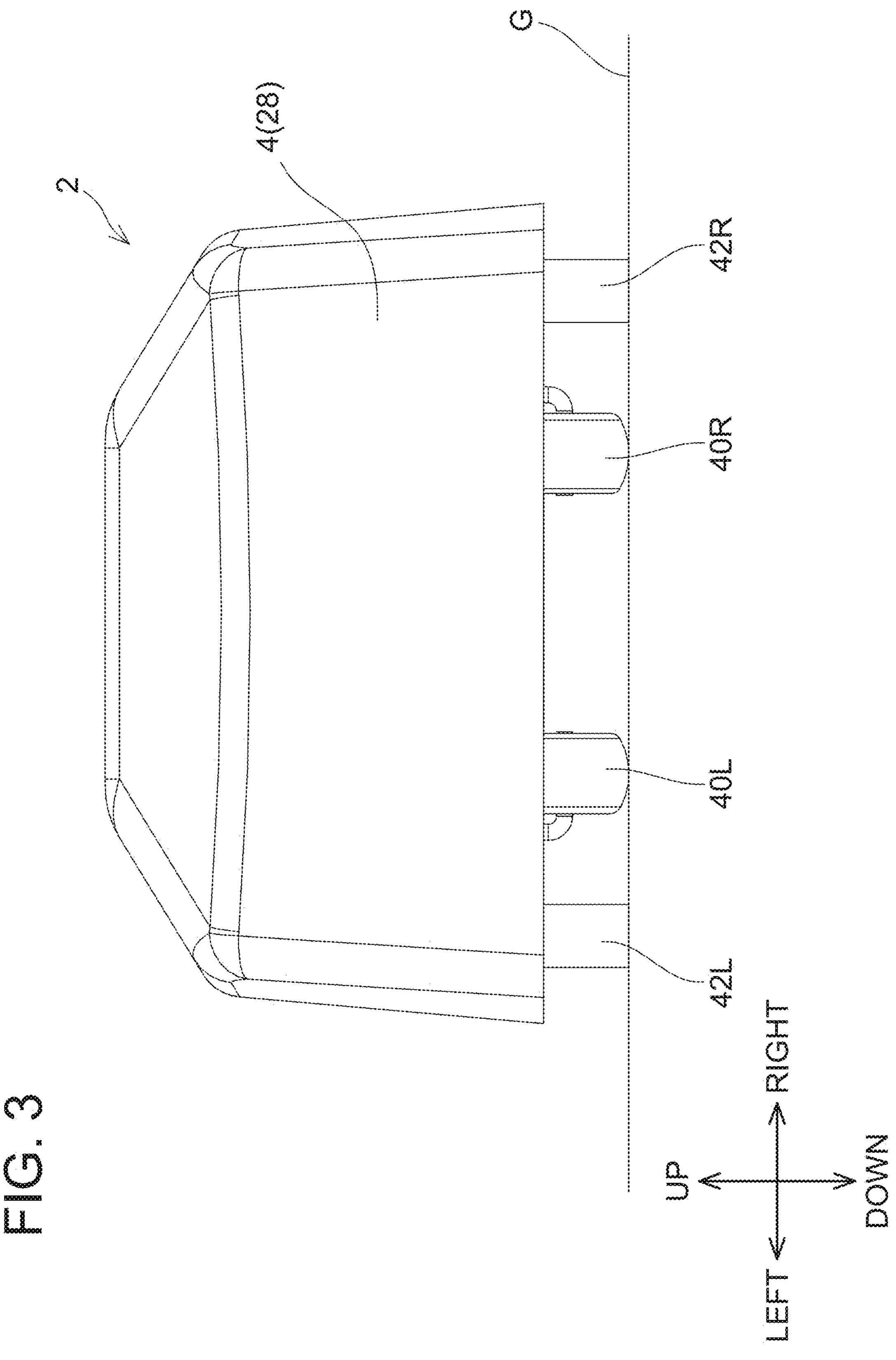
FIG. 3 shows a rear view of the robotic mower 2 according to the first embodiment.

As shown in FIGS. 2, 3, and 4, the robotic mower 2 comprises a robot body 4, a power unit 6, a control unit 8, an input unit 10, a communication unit 12, a display unit 14, an alarm unit 16, a movement unit 18, a working unit 20, a height adjustment unit 22, and a detection unit 24. The power unit 6, the control unit 8, the input unit 10, the communication unit 12, the display unit 14, the alarm unit 16, the movement unit 18, the working unit 20, the height adjustment unit 22, and the detection unit 24 are all supported by the robot body 4.

As shown in FIG. 2, the robot body 4 comprises a base frame 26 and a body 28 supported by the base frame 26. The body 28 covers the base frame 26 from above. The body 28 is supported by the base frame 26 such that the body 28 is movable relative to the base frame 26 in a front-rear direction, an up-down direction, and a right-left direction. Usually, the body 28 is retained in the position shown in FIG. 2 by a spring, etc.

The power unit 6 shown in FIG. 4 is configured to supply electric power to the units of the robotic mower 2 via a power supply circuit 38 of the control unit 8. The power unit 6 comprises a rechargeable battery 30 such as a lithium-ion battery and a charging interface 32 electrically connected to the battery 30. The nominal capacity of the battery 30 is for example 5.0 Ah. The nominal voltage of the battery 30 is for example 18 V. The robotic mower 2 is configured to dock with the charging station 110 (see FIG. 1) via the charging interface 32. When the robotic mower 2 is docked with the charging station 110, the battery 30 is recharged with electric power supplied from the charging station 110. The battery 30 may be charged in a wired manner. Specifically, a terminal of the charging station 110 and a terminal of the charging interface 32 may be connected to each other to charge the battery 30. Alternatively, the battery 30 may be charged in a wireless manner. Specifically, a transmitting coil of the charging station 110 may generate an induced electromotive force in a receiving coil of the charging interface 32 to charge the battery 30.

The control unit 8 comprises a processor 34, a memory 36, and the power supply circuit 38. The memory 36 comprises a ROM, a RAM, etc. A program to autonomically control the robotic mower 2 is stored in the ROM. Various signals inputted to the control unit 8 and various data (e.g., flag) created during processes executed by the processor 34 are temporarily stored in the RAM. The processor 34 is configured to control the robotic mower 2 by executing processes according to information stored in the memory 36. Settings related to the robotic mower 2 are also stored in the memory 36. The settings related to the robotic mower 2 include for example a setting related to a working time slot of the robotic mower 2. The working time slot of the robotic mower 2 here means a time slot in which the robotic mower 2 is allowed to work. By setting a working time slot, the robotic mower 2 is prevented from working in a time slot in which the user does not want the robotic mower 2 to work (e.g., during the night). The settings related to the robotic mower 2 also include a setting related to height adjustment for a blade 46. The setting related to height adjustment for the blade 46 includes enablement/disablement of an automatic height adjustment function to automatically adjust a height level h (see FIG. 2) of the blade 46 during an autonomous operation, which will be described later. The setting related to height adjustment for the blade 46 further includes settings on an initial height level of the blade 46, a target height level of the blade 46, and an area of the working region WA (see FIG. 1), which are required when the automatic height adjustment function is enabled, as well as a setting on a fixed height level of the blade 46, which is required when the automatic height adjustment function is disabled.

The input unit 10 is located on the outer surface of the body 28 (see FIG. 2) and comprises switches, etc. that are manipulatable by the user. The user can perform various input manipulations related to the robotic mower 2 to the input unit 10. The input manipulations here may include, for example, manipulations to switch the main power of the robotic mower 2 between on and off, manipulations to input instructions to the robotic mower 2, manipulations to change the settings related to the robotic mower 2, etc.

The communication unit 12 is an interface for connection to the internet for example via a base station (not shown) for mobile communications (3G, 4G, 5G, etc.) or a router (not shown) installed in the house 102. The control unit 8 is wirelessly communicable with a user's communication terminal (e.g., smartphone) via the communication unit 12. The control unit 8 can thus inform the user of an occurrence of abnormality in the robotic mower 2 through the user's communication terminal. Further, the user can perform various input manipulations related to the robotic mower 2 to the communication terminal as if he/she performed them to the input unit 10.

The display unit 14 is located on the outer surface of the body 28 (see FIG. 2). The display unit 14 comprises for example a display (not shown) configured to display letters and images and/or a light configured to display a state of the robotic mower 2 using chromaticity and/or blinking patterns of light. The state of the robotic mower 2 herein includes for example a state where the battery 30 is being charged, a state where an abnormality is occurring in the robotic mower 2, etc.

The alarm unit 16 comprises for example a buzzer (not shown). The alarm unit 16 is configured to emit a sound to inform an occurrence of abnormality in the robotic mower 2.

The movement unit 18 comprises a pair of a left caster 40L and a right caster 40R, a pair of a left drive wheel 42L and a right drive wheel 42R, and a pair of a left movement motor 44L and a right movement motor 44R. The movement motors 44L, 44R are for example brushless DC motors. The output shafts (not shown) of the movement motors 44L, 44R are coupled to the drive wheels 42L, 42R, respectively. As shown in FIGS. 2 and 3, when the robotic mower 2 is on a ground G, the casters 40L, 40R and the drive wheels 42L, 42R are in contact with the ground G. The movement unit 18 is configured to move the robotic mower 2 forward and rearward as well as turn the robotic mower 2 by driving the movement motors 44L, 44R (see FIG. 4) to rotate the drive wheels 42L, 42R. In this embodiment, regarding the up-down direction perpendicular to the ground G, the direction from the ground G toward the robot body 4 is termed an up direction, and the direction from the robot body 4 toward the ground G is termed a down direction; regarding the right-left direction perpendicular to the up-down direction, the direction from the drive wheel 42R toward the drive wheel 42L is termed a left direction and the direction from the drive wheel 42L toward the drive wheel 42R is termed a right direction; regarding the front-rear direction perpendicular to the up-down direction and the right-left direction, the direction from the drive wheels 42L, 42R toward the casters 40L, 40R is termed a front direction and the direction from the casters 40L, 40R toward the drive wheels 42L, 42R is termed a rear direction.

As shown in FIG. 2, the working unit 20 comprises the blade 46 and a working motor 48. The blade 46 is a substantially circular plate-shaped rotary blade. The working motor 48 is for example a brushless DC motor. The working motor 48 is arranged such that the upper end of its output shaft 50 is located forward of the lower end thereof. The output shaft 50 of the working motor 48 is coupled to the blade 46. The working unit 20 is configured to mow the lawn by driving the working motor 48 to rotate the blade 46.

The height adjustment unit 22 comprises a height adjustment mechanism 52 and a height adjustment motor 54. The height adjustment mechanism 52 comprises an outer tube 58 in which an internal thread is defined and an inner tube 62 in which an external thread 60 is defined. The external thread 60 of the inner tube 62 is screwed with the internal thread 56 of the outer tube 58. The outer tube 58 is supported such that the outer tube 58 is immovable in the up-down direction relative to the base frame 26 and is rotatable about an axis extending in the up-down direction relative to the base frame 26. The inner tube 62 is supported such that the inner tube 62 is movable in the up-down direction relative to the base frame 26 and is nonrotatable relative to the base frame 26. The working unit 20 is fixed to the inner tube 62. The height adjustment motor 54 is for example a brushless DC motor. The output shaft (not shown) of the height adjustment motor 54 is coupled to the outer tube 58 via gear(s), etc. The height adjustment unit 22 is configured to change the position of the inner tube 62 in the up-down direction by driving the height adjustment motor 54 to rotate the outer tube 58. In this, way, the height adjustment unit 22 changes the height level h of the blade 46. In this embodiment, the height level h of the blade 46 is expressed as a distance from the lower end of the blade 46 to the ground G. The height level h of the blade 46 is for example in a range from 10 mm to 80 mm, and in this embodiment, it can vary within a range from 20 mm to 60 mm.

As shown in FIG. 4, the detection unit 24 comprises a wire detection sensor 64, a collision detection sensor 66, a lift detection sensor 68, an angular velocity detection sensor 70, a motor current detection circuit 72, and a battery voltage detection circuit 74.

The wire detection sensor 64 is configured to detect the wire 112 (see FIG. 1). The wire detection sensor 64 is for example a Hall sensor. In this embodiment, a predetermined electric signal is applied to the wire 112 from the charging station 110 (see FIG. 1). Thus, a magnetic signal corresponding to the predetermined electric signal is generated around the wire 112. The wire detection sensor 64 detects this magnetic signal and outputs it to the control unit 8. Based on the signal pattern and/or signal intensity of the magnetic signal detected by the wire detection sensor 64, the control unit 8 determines whether the robotic mower 2 is approaching the wire 112 and/or whether the robotic mower 2 is positioned on the wire 112.

Figure 5:
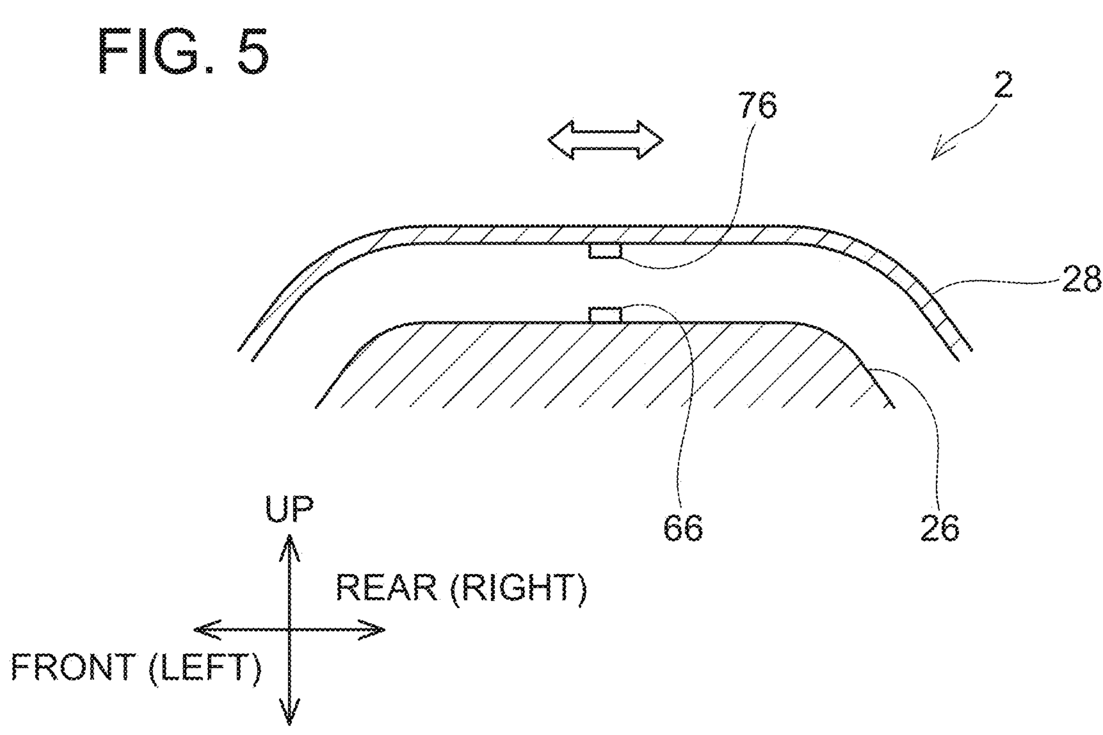
FIG. 5 schematically shows a configuration near a collision detection sensor 66 of the robotic mower 2 according to the first embodiment.

The collision detection sensor 66 is configured to detect a collision of the robotic mower 2 against an obstacle. The collision detection sensor 66 is for example a Hall sensor. As shown in FIG. 5, the collision detection sensor 66 is located on the base frame 26. A magnet 76 is located on a portion of the body 28 that faces the collision detection sensor 66 in the up-down direction. The collision detection sensor 66 detects the intensity of a magnetic field generated by the magnet 76 on the body 28. When the detected magnetic field intensity is high, the collision detection sensor 66 outputs an H signal to the control unit 8 (see FIG. 4), whereas when the detected magnetic field intensity is low, the collision detection sensor 66 outputs an L signal to the control unit 8. When the body 28 is in the position shown in FIG. 2, the horizontal position of the collision detection sensor 66 coincides with the horizontal position of the magnet 76. In this case, the magnetic field intensity detected by the collision detection sensor 66 is high, and thus the collision detection sensor 66 outputs the H signal to the control unit 8. When the body 28 moves horizontally from the position shown in FIG. 2, the horizontal position of the collision detection sensor 66 is thereby offset from the horizontal position of the magnet 76. In this case, the magnetic field intensity detected by the collision detection sensor 66 is low, and thus the collision detection sensor 66 outputs the L signal to the control unit 8.

Figure 6:
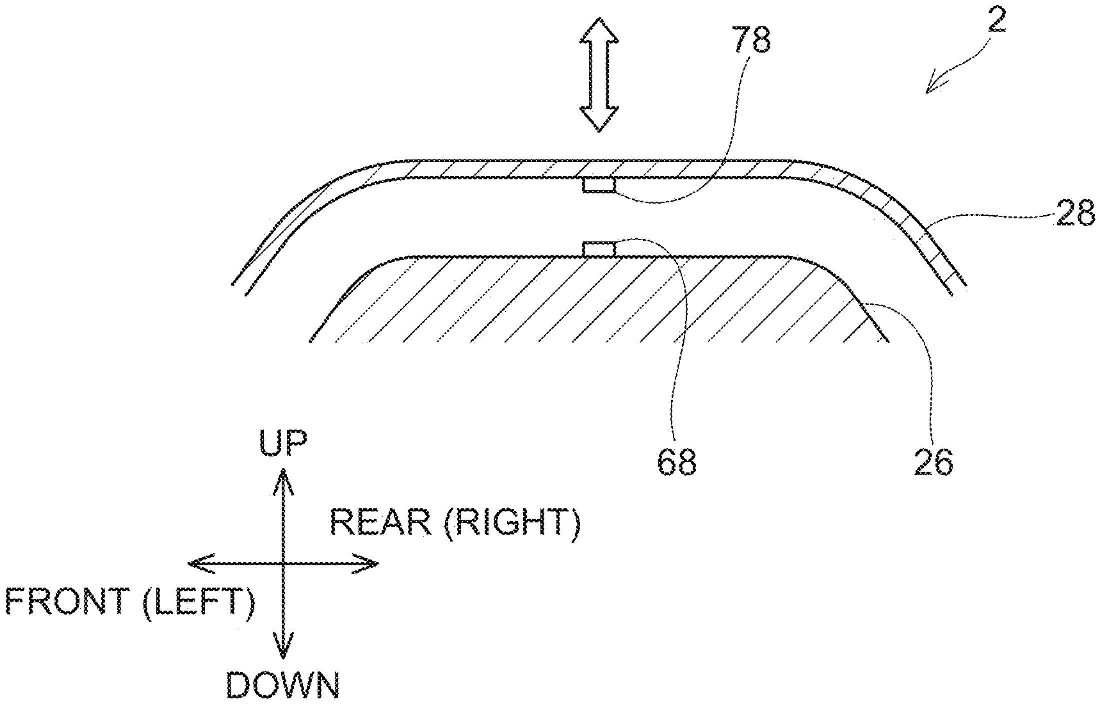
FIG. 6 schematically shows a configuration near a lift detection sensor 68 of the robotic mower 2 according to the first embodiment.

The lift detection sensor 68 is configured to detect a lift of the robotic mower 2 from the ground G. The lift detection sensor 68 is for example an inductive sensor. As shown in FIG. 6, the lift detection sensor 68 is located on the base frame 26. A metal plate 78 is located on a portion of the body 28 that faces the lift detection sensor 68 in the up-down direction. The lift detection sensor 68 detects whether the metal plate 78 on the body 28 is nearby. When detecting that the metal plate 78 is nearby, the lift detection sensor 68 outputs the H signal to the control unit 8 (see FIG. 4), whereas when detecting that the metal plate 78 is not nearby, the lift detection sensor 68 outputs the L signal to the control unit 8. When the body 28 is in the position shown in FIG. 2, the metal plate 78 is near the lift detection sensor 68, and thus the lift detection sensor 68 outputs the H signal to the control unit 8. When the body 28 moves upward from the position shown in FIG. 2, the metal plate 78 is distanced from the lift detection sensor 68, and thus the lift detection sensor 68 outputs the L signal to the control unit 8.

The angular velocity detection sensor 70 shown in FIG. 4 is located on/in the base frame 26 (see FIG. 2). The angular velocity detection sensor 70 is configured to detect an angular velocity of the base frame 26 and output it to the control unit 8.

The battery voltage detection circuit 74 is configured to detect a voltage value of the battery 30 (i.e., amount of remaining power in the battery 30) and output it to the control unit 8.

The motor current detection circuit 72 is configured to detect values of current supplied to the movement motors 44L, 44R and the working motor 48 and output them to the control unit 8.

Autonomous Operation

Hereinafter, an autonomous operation executed by the control unit 8 (specifically, the processor 34) will be described. In this embodiment, the autonomous operation varies depending on whether the automatic height adjustment function is enabled or disabled.

Autonomous Operation with Automatic Height Adjustment Function Enabled

With the automatic height adjustment function enabled, the robotic mower 2 changes the height level h of the blade 46 (see FIG. 2) from an initial height level to a target height level in stages. In this embodiment, the initial height level is larger than the target height level. For example, the initial height level is 50 mm and the target height level is 30 mm. That is, the robotic mower 2 lowers the height level h of the blade 46 from the initial height level to the target height level in stages. Hereinafter, referring to FIG. 7, the autonomous operation with the automatic height adjustment function enabled will be described in detail.

Figure 7:
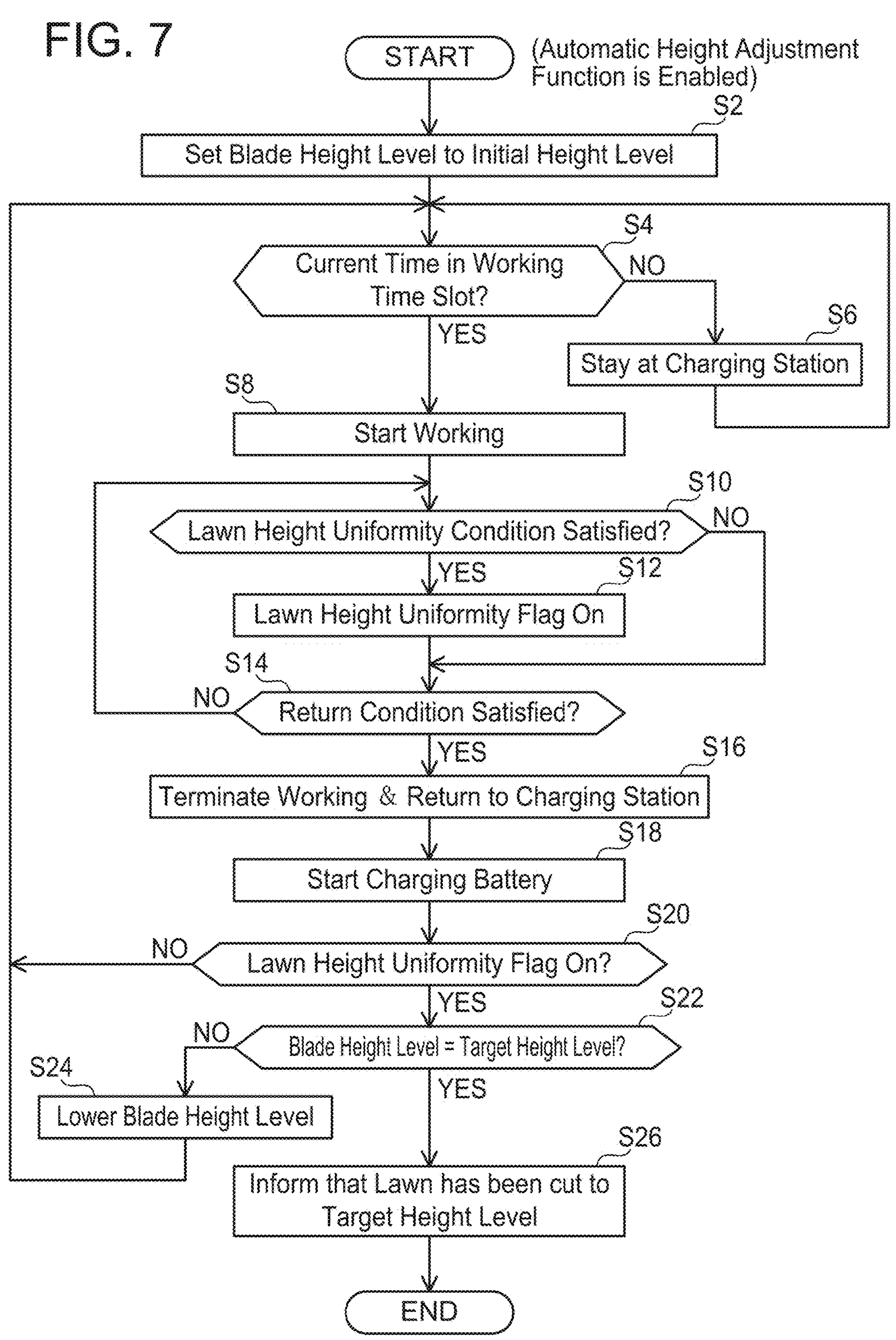
FIG. 7 shows a flowchart of an autonomous operation executed by a control unit 8 of the robotic mower 2 according to the first embodiment when an automatic height adjustment function is enabled.

The process shown in FIG. 7 is started in response to an instruction to start the autonomous operation being inputted via the input unit 10 (see FIG. 4) or the user's communication terminal when the automatic height adjustment function is enabled.

In S2, the control unit 8 controls the height adjustment motor 54 (see FIG. 2) to set the height level h of the blade 46 to the initial height level preset by the user. After S2, the process proceeds to S4.

In S4, the control unit 8 determines whether the current time is within a working time slot. When the current time is not within the working time slot (NO in S4), the process proceeds to S6.

In S6, the control unit 8 keeps the robotic mower 2 at the charging station 110 (see FIG. 1). If the robotic mower 2 is not at the charging station 110 at the start of S6, the control unit 8 returns the robotic mower 2 to the charging station 110. Specifically, the control unit 8 stops the working motor 48 (see FIG. 4) and controls the movement motors 44L, 44R (see FIG. 4) such that the robotic mower 2 can reach the charging station 110 following the wire 112. Then, the control unit 8 stops the movement motors 44L, 44R and keeps the robotic mower 2 at the charging station 110. After S6, the process returns to S4.

When the control unit 8 determines in S4 that the current time in within the working time slot (YES in S4), the process proceeds to S8. In S8, the control unit 8 causes the robotic mower 2 to start mowing work. Specifically, the control unit 8 controls the working motor 48 to cause the robotic mower 2 to mow the lawn using the blade 46 while controlling the movement motors 44L, 44R to move the robot body 4 around. Thereby, the lawn is cut to a height substantially equal to the height level h of the blade 46. After S8, the process proceeds to S10.

In S10, the control unit 8 determines whether a lawn height uniformity condition is satisfied. The lawn height uniformity condition is for example a condition under which the lawn within the working region WA (see FIG. 1) is expected to have been cut to the height level h of the blade 46 as a whole. The lawn height uniformity condition includes a first lawn height uniformity condition that a cumulative total of mowing work periods without a change in the height level h of the blade 46 exceeds a first working duration threshold. The mowing work periods hereof means periods within the total time period from the start to the end of the mowing work excluding periods during which the mowing work was suspended. The mowing work periods include for example a period during which the working motor 48 was in operation during the mowing work. The cumulative total of mowing work periods hereof means a sum of mowing work periods where the mowing work is performed multiple times without a change in the height level h of the blade 46. The first working duration threshold here is a duration threshold determined depending on the area of the working region WA. In the memory 36 of the control unit 8, the threshold table TT shown in FIG. 8 is stored. In the threshold table TT, areas of the working region WA are associated with corresponding first working duration thresholds. Thus, the control unit 8 can determine a first working duration threshold corresponding to the area of the working region WA preset by the user. In the threshold table TT, each area range is associated with its corresponding first working duration threshold. The lawn height uniformity condition further includes a second lawn height uniformity condition that a cumulative total of mowing work periods without charging of the battery 30 (see FIG. 4) exceeds a second working duration threshold. The second working duration threshold is for example 2 hours or longer, and in this embodiment, it is 2.5 hours. Typically, as a larger part of the lawn is cut to the height level h of the blade 46, the working motor 48 which drives the blade 46 experiences a smaller load, i.e., the battery 30 lasts longer. Since the battery 30 lasts longer, the cumulative total of mowing work periods without charging of the battery 30 becomes larger. Therefore, the lawn within the working region WA can be assumed to have been cut to the height level h of the blade 46 as a whole based on cumulative total of mowing work periods without charging of the battery 30 being large. When any one of the above-mentioned conditions is satisfied, the control unit 8 determines that the lawn height uniformity condition is satisfied (YES in S10). After the lawn height uniformity condition is satisfied (YES in S10), the process proceeds to S12.

In S12, the control unit 8 switches a lawn height uniformity flag to on. In other words, the control unit 8 stores in the memory 36 information indicating that the lawn height uniformity condition has been satisfied in S10.

When the lawn height uniformity condition is not satisfied in S10 (NO in S10) or after S12, the process proceeds to S14. In S14, the control unit 8 determines whether a predetermined return condition is satisfied. The return condition includes a first return condition that an amount of remaining power in the battery 30 is low. Specifically, the first return condition is a condition that the voltage value of the battery 30 detected by the battery voltage detection circuit 74 (see FIG. 4) is equal to or less than a predetermined voltage value (e.g., 17.5 V). The return condition further includes a second return condition that the lawn height uniformity flag is on. When any one of the above-mentioned conditions is satisfied, the control unit 8 determines that the return condition is satisfied (YES in S14). When the control unit 8 determine that the return condition is not satisfied (NO in S14), the process returns to S10. After the return condition is satisfied (YES in S14), the process proceeds to S16.

In S16, the control unit 8 causes the robotic mower 2 to stop the mowing work which was started in S8 and returns the robotic mower 2 to the charging station 110. Specifically, the control unit 8 stops the working motor 48 and controls the movement motors 44L, 44R such that the robotic mower 2 can reach the charging station 110 following the wire 112. After S16, the process proceeds to S18.

In S18, the control unit 8 docks the robotic mower 2 to the charging station 110 and starts charging the battery 30. The control unit 8 keeps charging the battery 30 until a predetermined charging termination condition is satisfied. The charging termination condition is for example that the voltage value of the battery 30 detected by the battery voltage detection circuit 74 reaches a predetermined value (e.g., 20 V) or more. When the charging of the battery 30 terminates in S18, the process proceeds to S20.

In S20, the control unit 8 determines whether the lawn height uniformity flag is on. When the control unit 8 determines that the lawn height uniformity flag is off (NO in S20), the process returns to S4. When the control unit 8 determines that the lawn height uniformity flag is on (YES in S20), the process proceeds to S22.

In S22, the control unit 8 determines whether the current height level h of the blade 46 is equal to the target height level preset by the user. When the control unit 8 determines that the height level h of the blade 46 is not equal to the target height level (i.e., the height level h of the blade 46 is higher than the target height level) (NO in S22), the process proceeds to S24.

In S24, the control unit 8 controls the height adjustment motor 54 (see FIG. 2) to lower the height level h of the blade 46 by a predetermined distance (e.g., 5 mm). During S24, the robotic mower 2 is at the charging station 110. Thus, the height level h of the blade 46 is lowered at the relatively safe place. The control unit 8 switches the lawn height uniformity flag to off in response to lowering the height level h of the blade 46. After S24, the process proceeds to S4.

When the control unit 8 determines in S22 that the height level h of the blade 46 is equal to the target height level (YES in S22), the process proceeds to S26. In S26, the control unit 8 informs the user that the lawn within the working region WA has been cut to the target height level as a whole. For example, the control unit 8 communicates with the user's communication terminal via the communication unit 12 (see FIG. 4) to cause the communication terminal to inform the user that the lawn within the working region WA has been cut to the target height level as a whole. After S26, the process shown in FIG. 7 terminates.

The process shown in FIG. 7 also terminates in response to an instruction to terminate the autonomous operation being inputted via the input unit 10 or the user's communication terminal. The process shown in FIG. 7 also terminates in response to the main power of the robotic mower 2 being switched to off via the input unit 10 or the user's communication terminal.

Autonomous Operation with Automatic Height Adjustment Function Disabled

When the automatic height adjustment function is disabled, the robotic mower 2 maintains the height level h of the blade 46 (see FIG. 2) at a fixed height level preset by the user. Hereinafter, referring to FIG. 9, the autonomous operation with the automatic height adjustment function disabled will be described.

Figure 9:
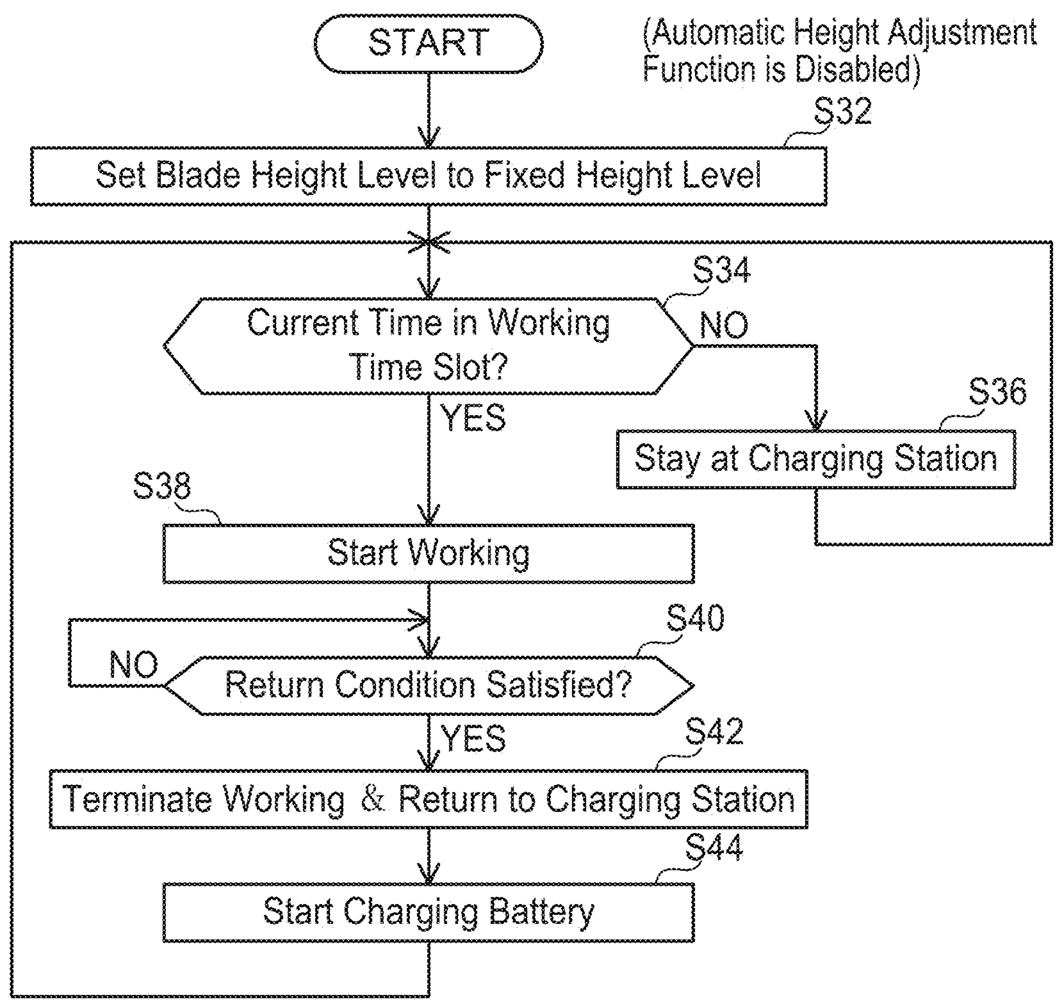
FIG. 9 shows a flowchart of the autonomous operation executed by the control unit 8 of the robotic mower 2 according to the first embodiment when the automatic height adjustment function is disabled.

The process shown in FIG. 9 is started in response to an instruction to start the autonomous operation being inputted via the input unit 10 (see FIG. 4) or the user's communication terminal when the automatic height adjustment function is disabled.

In S32, the control unit 8 controls the height adjustment motor 54 (see FIG. 2) to set the height level h of the blade 46 to the fixed height level. After S32, the process proceeds to S34.

In S34, the control unit 8 determines whether the current time is within a working time slot. When the control unit 8 determines that the current time is out of the working time slot (NO in S34), the process proceeds to S36.

In S36, the control unit 8 keeps the robotic mower 2 at the charging station 110 (see FIG. 1). If the robotic mower 2 is not at the charging station 110 at the start of S36, the control unit 8 returns the robotic mower 2 to the charging station 110. Specifically, the control unit 8 stops the working motor 48 (see FIG. 4) and controls the movement motors 44L, 44R (see FIG. 4) such that the robotic mower 2 can reach the charging station 110 following the wire 112. Then, the control unit 8 stops the movement motors 44L, 44R and keeps the robotic mower 2 at the charging station 110. After S36, the process returns to S34.

When the control unit 8 determines that the current time is within the working time slot (YES in S34), the process proceeds to S38. In S38, the control unit 8 causes the robotic mower 2 to start mowing work. Specifically, the control unit 8 controls the working motor 48 to cause the robotic mower 2 to mow the lawn using the blade 46 while controlling the movement motors 44L, 44R to move the robot body 4 around. After S38, the process proceeds to S40.

In S40, the control unit 8 determines whether a predetermined return condition is satisfied. This return condition is for example a condition that the voltage value of the battery 30 detected by the battery voltage detection circuit 74 (see FIG. 4) becomes equal to or less than a predetermined voltage value (e.g., 17.5 V). When the control unit 8 determines that the return condition is not satisfied (NO in S40), the process repeats S40. When the control unit 8 determines that the return condition is satisfied (YES in S40), the process proceeds to S42.

In S42, the control unit 8 causes the robotic mower 2 to stop the mowing work which was started in S38 and returns the robotic mower 2 to the charging station 110. Specifically, the control unit 8 stops the working motor 48 and controls the movement motors 44L, 44R such that the robotic mower 2 can return to the charging station 110 following the wire 112. After S42, the process proceeds to S44.

In S44, the control unit 8 docks the robotic mower 2 to the charging station 110 and starts charging the battery 30. The control unit 8 keeps charging the battery 30 until a predetermined charging termination condition is satisfied. This charging termination condition is for example a condition that the voltage value of the battery 30 detected by the battery voltage detection circuit 74 becomes a predetermined value (e.g., 20 V) or more. When the charging of the battery 30 terminates in S44, the process returns to S34.

The process shown in FIG. 9 terminates in response to an instruction to terminate the autonomous operation being inputted via the input unit 10 or the user's communication terminal. The process shown in FIG. 9 also terminates in response to the main power of the robotic mower 2 being switched to off via the input unit 10 or the user's communication terminal.

Behavior of Robotic Mower 2 Upon Bump Against Obstacle

During the autonomous operation, the control unit 8 repeats the process shown in FIG. 10 regardless of whether the automatic height adjustment function is enabled or disabled.

In S52, the control unit 8 determines whether movement of the body 28 (see FIG. 2) relative to the base frame 26 (see FIG. 2) is detected. Specifically, the control unit 8 determines whether at least one of the collision detection sensor 66 (see FIG. 4) and the lift detection sensor 68 (see FIG. 4) outputs the L signal. When the control unit 8 determines that movement of the body 28 relative to the base frame 26 is not detected (NO in S52), the process proceeds to S54.

In S54, the control unit 8 determines that the robotic mower 2 is not hindered from moving. After S54, the process returns to S52.

When the control unit 8 determines in S52 that movement of the body 28 relative to the base frame 26 is detected (YES in S52), the process proceeds to S56. In S56, the control unit 8 determines that the robotic mower 2 is hindered from moving by an obstacle. In response, the control unit 8 stops the movement motors 44L, 44R (see FIG. 4) and the working motor 48 (see FIG. 4) to suspend a normal action. The normal action here means the mowing work performed by the robotic mower 2 or the returning of the robotic mower 2 during the autonomous operation. After S56, the process proceeds to S58.

In S58, the control unit 8 controls the movement motors 44L, 44R to cause the robotic mower 2 to start performing a circumvention action. The circumvention action here is for example any one of a forward action in which the robotic mower 2 moves forward, a rearward action in which the robotic mower 2 moves rearward, a left turning action in which the robotic mower 2 turns left, and a right turning action in which the robotic mower 2 turns right. The turning actions here include actions in which the robotic mower 2 turns on the spot but also actions in which the robotic mower 2 turns while moving forward or rearward. In this embodiment, the control unit 8 specifies the moving direction of the robotic mower 2 prior to the suspension of the normal action in S56. Then, the control unit 8 determines the circumvention action to be started in S58 as an action in which the robotic mower 2 moves in the opposite direction to the moving direction prior to the suspension of normal action in S56. As an example, if the robotic mower 2 was moving forward before the normal action was suspended in S56, the circumvention action to be started in S58 is the rearward action. As another example, if the robotic mower 2 was turning left before the normal action was suspended in S56, the circumvention action to be started in S58 is the right turning action. After S58, the process proceeds to S60.

In S60, the control unit 8 determines whether movement of the body 28 relative to the base frame 26 is detected during the circumvention action started immediately before S60 (i.e., the circumvention action started in S58 or S62). Specifically, the control unit 8 determines whether the signal(s) from at least one of the collision detection sensor 66 and the lift detection sensor 68 change from the H signal to the L signal during the circumvention action. It should be noted that if at least one of the sensors keeps outputting the L signal from the start of the circumvention action, this L signal from the sensor(s) is not considered as the L signal changed from the H signal during the circumvention action. Thus, the answer YES is not produced to the determination in S60 based on such L signal(s) from the sensor(s). In this regard, the answer YES/No to the determination in S60 is different from the answer YES/NO to the determination in S52. When the control unit 8 determines that movement of the body 28 relative to the base frame 26 is detected during the circumvention action (YES in S60), the process proceeds to S62.

In S62, the control unit 8 causes the robotic mower 2 to start a circumvention action different from the previous circumvention action. For example, if the previous circumvention action was the forward action, the control unit 8 causes the robotic mower 2 to start the rearward action, the left turning action, or the right turning action. After S62, the process returns to S60.

When the control unit 8 determines in S60 that movement of the body 28 relative to the base frame 26 is not detected during the circumvention action (NO in S60), the process proceeds to S64. In S64, the control unit 8 determines whether an overload on the movement motors 44L, 44R is detected during the circumvention action started prior to the answer NO to the determination in S60. Specifically, the control unit 8 determines whether values of current flowing in the movement motors 44L, 44R detected by the motor current detection circuit 72 (see FIG. 4) remain at or above a predetermined current value (e.g., 3.0 A) for a predetermined duration (e.g., 0.1 seconds) or longer. When the control unit 8 determines that an overload on the movement motors 44L, 44R is detected during the circumvention action (YES in S64), the process proceeds to S66.

In S66, the control unit 8 determines that the robotic mower 2 is hindered from moving (performing the circumvention action) by an obstacle. For example, if a part of the robotic mower 2 other than the body 28 (e.g., the drive wheel 42L or 42R) bumps an obstacle, the robotic mower 2 is hindered from moving by the obstacle despite movement of the body 28 being not detected (despite the answer to the determination in S60 being NO). In this case, however, the movement motors 44L, 44R are expected to experience a larger load than usual due to the blocking of the obstacle. Thus, the robotic mower 2 according to this embodiment determines that the robotic mower 2 is hindered from moving by an obstacle when detecting an overload on the movement motors 44L, 44R (in case of YES to the determination in S64). In S66, the control unit 8 further increments by 1 the number of times the robotic mower 2 has been hindered from moving by an obstacle (this number may be termed "count number" hereinafter). Since the count number is reset to zero at the end of the process shown in FIG. 10, it is zero at the start of the process shown in FIG. 10. After S66, the process proceeds to S68.

In S68, the control unit 8 determines whether the count number is equal to or more than a predetermined number (e.g., 2). When the control unit 8 determines that the count number is less than the predetermined number (NO in S68), the process proceeds to S62. When the control unit 8 determines that the count number is equal to or more than the predetermined number (YES in S68), the process proceeds to S70.

In S70, the control unit 8 determines that an abnormality is occurring in the robotic mower 2 and stops the robotic mower 2. Specifically, the control unit 8 stops the movement motors 44L, 44R and the working motor 48 to keep the robotic mower 2 on the spot. The control unit 8 further controls the display unit 14 (see FIG. 4) and/or the alarm unit 16 (see FIG. 4) to inform the user of the occurrence of abnormality by light and/or sound. Alternatively, the control unit 8 communicates with the user's communication terminal (e.g., smartphone) via the communication unit 12 (see FIG. 4) to inform the user of the occurrence of abnormality through the communication terminal. After S70, the process shown in FIG. 10 terminates.

When the control unit 8 determines in S64 that an overload on the movement motors 44L, 44R is not detected during the circumvention action (NO in S64), the process proceeds to S72. In S72, the control unit 8 determines whether the circumvention action started in S58 or S62 has terminated. In this embodiment, the control unit 8 presets how many times the output shafts of the movement motors 44L, 44R are to be rotated for a circumvention action, and monitors the numbers of rotations of the output shafts of the movement motors 44L, 44R using rotation detection sensors (e.g., resolvers) for the movement motors 44L, 44R. Thus, the control unit 8 determines that the circumvention action has terminated for example in response to the numbers of rotations of the output shafts of the movement motors 44L, 44R from the start of the circumvention action reaching the preset numbers of rotations (YES in S72). When the control unit 8 determines that the circumvention action has not terminated yet (NO in S72), the process proceeds to S60. When the control unit 8 determines that the circumvention action has terminated (YES in S72), the process proceeds to S74.

In S74, the control unit 8 determines that the robotic mower 2 is not hindered from moving (specifically, performing the circumvention action). This is because movement of the robotic mower 2 is thought to terminate without a hitch since an overload on the movement motors 44L, 44R was not detected. The control unit 8 further resumes the normal action suspended in S56 (the mowing work or returning). After S74, the process shown in FIG. 10 terminates.

Second Embodiment: Robotic Mower 202

A robotic mower 202 has substantially the same configuration as that of the robotic mower 2 according to the first embodiment (see FIGS. 1 to 10). The robotic mower 202 is different from the robotic mower 2 according to the first embodiment only in that the control unit 8 (see FIG. 4) executes the process shown in FIG. 11 instead of the process shown in FIG. 10. Thus, hereinafter, only the process shown in FIG. 11 is described, and other descriptions are omitted.

In S102, the control unit 8 determines whether movement of the body 28 (see FIG. 2) relative to the base frame 26 (see FIG. 2) is detected. Specifically, the control unit 8 determines whether at least one of the collision detection sensor 66 (see FIG. 4) and the lift detection sensor 68 (see FIG. 4) is outputting the L signal(s). When the control unit 8 determines that movement of the body 28 relative to the base frame 26 is not detected (NO in S102), the process proceeds to S104.

In S104, the control unit 8 determines that the robotic mower 202 is not hindered from moving. After S104, the process returns to S102.

When the control unit 8 determines in S102 that movement of the body 28 relative to the base frame 26 is detected (YES in S102), the process proceeds to S106. In S106, the control unit 8 determines that the robotic mower 202 is hindered from moving by an obstacle. Then, the control unit 8 stops the movement motors 44L, 44R (see FIG. 4) and the working motor 48 (see FIG. 4) to suspend the normal action (the mowing work or returning). Ater S106, the process proceeds to S108.

In S108, the control unit 8 controls the movement motors 44L, 44R to cause the robotic mower 202 to perform a straight action (i.e., the forward action or the rearward action). In this embodiment, the control unit 8 determines whether the moving direction of the robotic mower 202 prior to the suspension of normal action in S106 was the front direction or rear direction. Then the control unit 8 determines the straight action to be performed in S108 as an action in which the robotic mower 202 moves in the opposite direction to the moving direction thereof prior to the suspension of normal action in S106. For example, if the robotic mower 202 was moving in the front direction before the normal action was suspended in S106, the straight action to be performed in S108 is the rearward action. When the straight action terminates, the process proceeds to S110.

In S110, the control unit 8 controls the movement motors 44L, 44R to cause the robotic mower 202 to start a turning action (i.e., the left turning action or the right turning action). At this time, the control unit 8 randomly sets a turning direction of the robotic mower 202 and a target turning angle of the robotic mower 202. The target turning angle is for example within a range from 10 degrees to 180 degrees. The control unit 8 controls the movement motors 44L, 44R to turn the robotic mower 202 in the set turning direction and by the set target turning angle. After S110, the process proceeds to S112.

In S112, the control unit 8 determines whether the angle by which the robotic mower 202 has turned from the start of the turning action is equal to the target turning angle. The control unit 8 uses the angular velocity detection sensor 70 (see FIG. 4) located on the base frame 26 to measure an angle by which the robotic mower 202 has turned from the start of the turning action. When the control unit 8 determines that the angle by which the robotic mower 202 has turned from the start of turning action is less than the target turning angle (NO in S112), the process proceeds to S114.

In S114, the control unit 8 determines whether a period elapsed from the start of turning action in S110 reaches a predetermined period (e.g., 6.0 seconds) or longer. When the control unit 8 determines that the period elapsed is less than the predetermined period (NO in S114), the process returns to S112. When the control unit 8 determines that the period elapsed is longer than the predetermined period (YES in S114), the process proceeds to S116.

In S116, the control unit 8 determines that the robotic mower 202 is hindered from moving (performing the circumvention action) by an obstacle. For example, if a part of the robotic mower 202 other than the body 28 (e.g., the drive wheel 42L or 42R) bumps an obstacle, the robotic mower 202 is thereby hindered from moving despite movement of the body 28 being not detected (the answer to the determination in S102 being NO). In this case, the turning angle of the robotic mower 202 is expected not to change at all due to the blocking of the obstacle despite the movement motors 44L, 44R being driven. Thus, the robotic mower 202 according to this embodiment determines that the robotic mower 202 is hindered from moving by an obstacle when the turning angle of the robotic mower 202 remains less than the target turning angle for a certain period of time (in case of YES in S114). In S116, the control unit 8 further increments by 1 the number of times the robotic mower 202 has been hindered from moving by an obstacle (this number may be termed "count number" hereinafter). Since the count number is reset to zero at the end of the process shown in FIG. 11, it is zero at the start of the process shown in FIG. 11. After S116, the process proceeds to S118.

In S118, the control unit 8 determines whether the count number is equal to or more than a predetermined number (e.g., 2). When the control unit 8 determines that the count number is less than the predetermined number (NO in S118), the process proceeds to S120.

In S120, the control unit 8 causes the robotic mower 202 to start a turning action which is opposite in direction to the previous turning action. For example, if the previous turning action was the left turning action, the control unit 8 causes the robotic mower 202 to start the right turning action. After S120, the process returns to S112.

When the control unit 8 determines in S118 that the count number is equal to or more than the predetermined number (YES in S118), the process proceeds to S122. In S122, the control unit 8 determines that an abnormality is occurring in the robotic mower 202 and stops the robotic mower 202. Specifically, the control unit 8 stops the movement motors 44L, 44R and the working motor 48 to keep the robotic mower 202 on the spot. The control unit 8 further controls the display unit 14 (see FIG. 4) and/or the alarm unit 16 (see FIG. 4) to inform the user of the occurrence of abnormality by light and/or sound. Alternatively, the control unit 8 communicates with the user's communication terminal (e.g., smartphone) via the communication unit 12 (see FIG. 4) to inform the user of the occurrence of abnormality through the communication terminal. After S122, the process shown in FIG. 11 terminates.

When the control unit 8 determines in S112 that the angle by which the robotic mower 202 has turned from the start of turning action is equal to the target turning angle (YES in S112), the process proceeds to S124.

In S124, the control unit 8 determines that the robotic mower 202 is not hindered from moving (specifically, performing the circumvention action) by an obstacle. This is because movement of the robotic mower 202 is thought to have terminated based on the fact that the turning angle of the robotic mower 202 became equal to the target turning angle. Further, the control unit 8 resumes the normal action suspended in S106 (the mowing work or returning). After S124, the process shown in FIG. 11 terminates.

Third Embodiment: Robotic Mower 302

A robotic mower 302 has substantially the same configuration as that of the robotic mower 2 according to the first embodiment (see FIGS. 1 to 10). The robotic mower 302 is different from the robotic mower 2 according to the first embodiment only in that the control unit 8 (see FIG. 4) executes the process shown in FIG. 12 instead of the process shown in FIG. 10. The process shown in FIG. 12 is different from the process shown in FIG. 10 in that S60 and S64 are replaced with S160 and S164. Thus, hereinafter, only S160 and S164 in FIG. 12 are described, and other descriptions are omitted.

S160 is executed after S58 or after S62. In S160, the control unit 8 determines whether movement of the body 28 relative to the base frame 26 is detected during the circumvention action started immediately before S160 (started in S58 or S62). Specifically, the control unit 8 determines whether the signal(s) from at least one of the collision detection sensor 66 (see FIG. 4) and the lift detection sensor 68 (see FIG. 4) change from the H signal(s) to the L signal(s) during the circumvention action. It should be noted that if at least one of the sensors keeps outputting the L signal(s) from the start of the circumvention action, this L signal is not considered as the L signal changed from the H signal during the circumvention action. Thus, the answer YES is not produced to the determination in S160 based on such L signal(s) from the sensor(s). In this regard, the answer YES/NO to the determination in S160 is different from the answer YES/NO to the determination in S52. When the control unit 8 determines that movement of the body 28 relative to the base frame 26 is not detected during the circumvention action (NO in S160), the process proceeds to S72. When the control unit 8 determines that movement of the body 28 relative to the base frame 26 is detected (YES in S160), the process proceeds to S164.

In S164, the control unit 8 determines whether an overload on the movement motors 44L, 44R is detected during the circumvention action started immediately before the answer YES was produced to the determination in S160. Specifically, the control unit 8 determines whether values of current flowing in the movement motors 44L, 44R detected by the motor current detection circuit 72 (see FIG. 4) remain at or above a predetermined current value (e.g., 3.0 A) for a predetermined duration (e.g., 0.1 seconds) or longer. When the control unit 8 determines that an overload on the movement motors 44L, 44R is not detected during the circumvention action (NO in S164), the process proceeds to S62. When the control unit 8 determines that an overload on the movement motors 44L, 44R is detected during the circumvention action (YES in S164), the process proceeds to S66.

When movement of the body 28 is detected (YES in S160), the robotic mower 302 is probably hindered from moving by an obstacle but that is not totally certain unless an overload on the movement motors 44L, 44R is detected (NO in S164). In this case, the robotic mower 302 according to this embodiment does not determine whether the robotic mower 302 is hindered from moving by an obstacle or not and performs a different circumvention action. In response to movement of the body 28 being detected (YES in S160) and an overload on the movement motors 44L, 44R being detected (YES in S164), the control unit 8 determines that the robotic mower 302 is hindered from moving by an obstacle. This prevents the control unit 8 from making an erroneous determination (determining that the robotic mower 302 is hindered from moving by an obstacle despite the robotic mower 302 being not hindered from moving actually).

Fourth Embodiment: Robotic Mower 402

A robotic mower 402 has substantially the same configuration as that of the robotic mower 2 according to the first embodiment (see FIGS. 1 to 10). The robotic mower 402 is different from the robotic mower 2 according to the first embodiment only in that the control unit 8 (see FIG. 4) executes the process shown in FIG. 13 instead of the process shown in FIG. 7. Thus, hereinafter, only the process shown in FIG. 13 is described, and other descriptions are omitted.

In S202, the control unit 8 controls the height adjustment motor 54 (see FIG. 2) to set the height level h of the blade 46 (see FIG. 2) to the initial height level preset by the user. After S202, the process proceeds to S204.

In S204, the control unit 8 determines whether the current time is within a working time slot. When the control unit 8 determines that the current time is out of the working time slot (NO in S204), the process proceeds to S206.

In S206, the control unit 8 keeps the robotic mower 402 at the charging station 110 (see FIG. 1). If the robotic mower 402 is not at the charging station 110 at the start of S206, the control unit 8 returns the robotic mower 402 to the charging station 110. Specifically, the control unit 8 stops the working motor 48 (see FIG. 4) and controls the movement motors 44L, 44R (see FIG. 4) such that the robotic mower 402 can reach the charging station 110 following the wire 112. The control unit 8 then stops the movement motors 44L, 44R to keep the robotic mower 402 at the charging station 110. After S206, the process returns to S204.

When the control unit 8 determines in S204 that the current time is within the working time slot (YES in S204), the process proceeds to S208. In S208, the control unit 8 causes the robotic mower 402 to start mowing work. Specifically, the control unit 8 controls the working motor 48 to cause the robotic mower 402 to mow the lawn using the blade 46 (see FIG. 2) while controlling the movement motors 44L, 44R to move the robot body 4 around. The lawn is thereby cut to the height level h of the blade 46. After S208, the process proceeds to S210.

In S210, the control unit 8 determines whether a predetermined lawn height uniformity condition is satisfied. The lawn height uniformity condition here is substantially the same as the one described in connection with the first embodiment and thus the description is not repeated here.

When the control unit 8 determines that the lawn height uniformity condition is satisfied (YES in S210), the process proceeds to S212.

In S212, the control unit 8 determines whether the current height level h of the blade 46 is equal to the target height level preset by the user. When the control unit 8 determines that the height level h of the blade 46 is not equal to the target height level (i.e., the height level h of the blade 46 is higher than the target height level) (NO in S212), the process proceeds to S214.

In S214, the control unit 8 controls the height adjustment motor 54 to lower the height level h of the blade 46 by a predetermined distance (e.g., 5 mm).

When the control unit 8 determines in S212 that the height level h of the blade 46 is equal to the target height level (YES in S212), the process proceeds to S216. In S216, the control unit 8 switches a target height level flag to on. The target height level flag indicates that the lawn within the working region WA has been cut to the target height level as a whole.

When the control unit 8 determines in S210 that the lawn height uniformity condition is not satisfied (NO in S210), after S214, or after S216, the process proceeds to S218. In S218, the control unit 8 determines whether a predetermined return condition is satisfied. The return condition here is substantially the same as the one described in connection with the first embodiment and thus the description is not repeated here. When the control unit 8 determines that the return condition is not satisfied (NO in S218), the process returns to S210. When the control unit 8 determines that the return condition is satisfied (YES in S218), the process proceeds to S220.

In S220, the control unit 8 causes the robotic mower 402 to stop the mowing work which was started in S208 and return to the charging station 110. Specifically, the control unit 8 stops the working motor 48 and controls the movement motors 44L, 44R such that the robotic mower 402 can reach the charging station 110 following the wire 112. After S220, the process proceeds to S222.

In S222, the control unit 8 docks the robotic mower 402 to the charging station 110 and starts charging the battery 30 (see FIG. 4). The control unit 8 keeps charging the battery 30 until a predetermined charging termination condition is satisfied. The charging termination condition is for example that the voltage value of the battery 30 detected by the battery voltage detection circuit 74 (see FIG. 4) becomes equal to or more than a predetermined value (e.g., 20 V). When the charging of the battery 30 terminates in S222, the process proceeds to S224.

In S224, the control unit 8 determines whether the target height level flag is on. When the control unit 8 determines that the target height level flag is off (NO in S224), the process returns to S204. When the control unit 8 determines that the target height level flag is on (YES in S224), the process proceeds to S226.

In S226, the control unit 8 informs the user that the lawn within the working region WA has been cut to the target height level as a whole. For example, the control unit 8 communicates with the user's communication terminal via the communication unit 12 (see FIG. 4) to inform the user that the lawn within the working region WA has been cut to the target height level as a whole through the communication terminal. After S226, the process shown in FIG. 13 terminates.

Variants

The working robot may be a robot other than the robotic mowers 2, 202, 302, 402. For example, the working robot may be a robot cleaner comprising a brush and/or a suction mechanism for collecting debris such as dust. In this case, the working motor 48 may be used to drive the brush and/or the suction mechanism. Alternatively, the working robot may be a rebar tying robot comprising a rebar tying mechanism configured to tie multiple rebars at their intersections. In this case, the working motor 48 may be used to drive the rebar tying mechanism.

A power cable connected to an external power supply (e.g., a commercial power supply) may be connected to each of the robotic mowers 2, 202, 302, 402. In this case, the robotic mowers 2, 202, 302, 402 may be configured to operate using electric power supplied from the external power supply through the power cable.

The robotic mowers 2, 202, 302, 402 each may not comprise the battery 30. Instead, a rechargeable battery pack such as a lithium-ion battery may be detachably attached to the robot body 4. In this case, the robotic mowers 2, 202, 302, 402 may be configured to operate using electric power supplied from the battery pack.

The movement unit 18 may comprise, instead of the casters 40L, 40R and the drive wheels 42L, 42R, another movement mechanism (e.g., a crawler, a side stepper). The side stepper here comprises a mechanism configured to move the robot body 4 in the right-left direction. If the movement unit 18 comprises the side stepper, the circumvention action may include actions in which the robot body 4 is moved leftward and rightward.

The return condition used in S14 shown in FIG. 7 may not include the second return condition. Instead, the return condition used in S14 shown in FIG. 7 may include a third return condition that the lawn height uniformity flag is on and the amount of remaining power in the battery 30 is relatively large (e.g., the voltage value of the battery 30 is equal to or more than 19 V).

The distance by which the height level h of the blade 46 is to be lowered in S24 shown in FIG. 7 (or in S214 shown in FIG. 13) may not be predetermined. For example, the control unit 8 may randomly determine the distance. Alternatively, the control unit 8 may set the distance such that a distance by which the height level h of the blade 46 is to be lowered when S24 (or S214) is executed for the first time during the autonomous operation is greater than a distance by which the height level h of the blade 46 is to be lowered when S24 (or S214) is executed next time. Alternatively, the user may change the distance by which the height level h of the blade 46 is to be lowered using the input unit 10 or the user's communication terminal.

The robotic mowers 2, 202, 302, 402 each may have a mapping function to create map information of the working region WA. For example, the control unit 8 may create the map information by acquiring movement history of the robotic mower 2, 202, 302, 402 through an GPS. The map information of the working region WA may include the area of the working region WA. This allows the control unit 8 to acquire the area of the working region WA without the user setting it.

In the process shown in FIG. 10, after S58 or after S62, the process may skip S60 and proceeds to S64. That is, while the robotic mower 2 is performing the circumvention action, the control unit 8 may determine whether the robotic mower 2 is hindered from moving by an obstacle not based on detection results from the collision detection sensor 66 and the lift detection sensor 68 but only based on detection result from the motor current detection circuit 72.

When the control unit 8 determines in S60 shown in FIG. 10 that movement of the body 28 relative to the base frame 26 is detected (YES in S60), the process may proceed to S66. That is, the control unit 8 may determine that the robotic mower 2 is hindered from moving by an obstacle when movement of the body 28 is detected during the circumvention action.

In S60 shown in FIG. 10 (or in S160 shown in FIG. 12), the control unit 8 may determine whether the L signal(s) are outputted from at least one of the collision detection sensor 66 and the lift detection sensor 68, instead of determining whether the signal(s) from at least one of the collision detection sensor 66 and the lift detection sensor 68 change from the H signal(s) to the L signal(s) during the circumvention action. That is, the control unit 8 may answer YES to the determination in S60 (or in S160) when the L signal(s) are outputted from at least one of the sensors, even without the change from the H signal to the L signal.

In S64 shown in FIG. 10 (or in S164 shown in FIG. 12), the control unit 8 may determine whether values of current flowing in the movement motors 44L, 44R detected by the motor current detection circuit 72 are equal to or more than the predetermined current value, instead of determining whether values of current flowing in the movement motors 44L, 44R detected by the motor current detection circuit 72 remain at or above the predetermined current value for the predetermined duration. That is, the control unit 8 may answer YES to the determination in S64 (or in S164) upon when values of current flowing in the movement motors 44L, 44R detected by the motor current detection circuit 72 become equal to or more than the predetermined current value.

The robotic mowers 2, 202, 302, 402 each may further comprise an inclination angle detection sensor (e.g., a gyroscope sensor) configured to detect an inclination angle of the base frame 26 to the horizontal direction. In this case, in S52 and S60 shown in FIG. 10 (or in S102 shown in FIG. 11, in S52 and S160 shown in FIG. 12), the control unit 8 may determine whether an inclination angle of the base frame 26 detected by the inclination angle detection sensor is greater than a predetermined angle threshold (e.g., 90 degrees). Alternatively, the control unit 8 may determine whether the L signal(s) is outputted from at least one of the collision detection sensor 66 (see FIG. 4) and the lift detection sensor 68 (see FIG. 4) and whether an inclination angle of the base frame 26 detected by the inclination angle detection sensor is greater than the predetermined angle threshold. In S64 shown in FIG. 10 (or in S164 shown in FIG. 12), the control unit 8 may determine whether an inclination angle of the base frame 26 detected by the inclination angle detection sensor is greater than a predetermined angle threshold (e.g., 90 degrees). Alternatively, the control unit 8 may determine whether an overload on the movement motors 44L, 44R is detected and whether an inclination angle of the base frame 26 detected by the inclination angle detection sensor is greater than the predetermined angle threshold. The control unit 8 may determine that the robotic mower 2, 202, 302, 402 is hindered from moving by an obstacle when the inclination angle of the base frame 26 is excessively large.

Features of Embodiments

As described, in one or more embodiments, the robotic mowers 2, 202, 302, 402 (examples of working robot) each comprises the robot body 4, the movement unit 18 configured to move the robot body 4, the blade 46 (the working unit 20) supported by the robot body 4, the height adjustment unit 22 configured to change the height level h of the blade 46 relative to the robot body 4, and the control unit 8.

The control unit 8 is configured to execute the autonomous operation including the working process of causing the blade 46 to perform the mowing work while moving the robot body 4 by the movement unit 18 (S8, S14, S16 in FIG. 7) (or S38, S40, S42 in FIG. 9) (or S208, S218, S220 in FIG. 13) and the height adjustment process of causing the height adjustment unit 22 to adjust the height level h of the blade 46 relative to the robot body 4 in multiple steps (S2, S10, S12, S20, S22, S24, S26 in FIG. 7) (or S202, S210, S212, S214, S216, S224, S226 in FIG. 13). The robotic mowers 2, 202, 302, 402 is each configured to be switched between the state in which the automatic height adjustment function is enabled (an example of first state in which the control unit executes the height adjustment process during the autonomous operation) and the state in which the automatic height adjustment function is disabled (an example of second state in which the control unit does not execute the height adjustment process during the autonomous operation).

According to the configuration above, the robotic mower 2, 202, 302, 402 can adjust the height level h of the blade 46 during the autonomous operation by executing the height adjustment process, without a user's manual manipulation. This improves the usability of the robotic mower 2, 202, 302, 402 because the user does not have to monitor the progress of work performed by the robotic mower 2, 202, 302, 402. However, in some cases, it is desirable not to execute the height adjustment process, such as when the user wishes to keep the height level h of the blade 46 constant throughout the autonomous operation. According to the configuration above, the state of the robotic mower 2, 202, 302, 402 can be switched between the state in which the automatic height adjustment function is enabled and the state in which the automatic height adjustment function is disabled. This also improves the usability of the robotic mower 2, 202, 302, 402 because the user can select whether the control unit executes the height adjustment process during the autonomous operation or not.

In one or more embodiments, the robotic mowers 2, 202, 302, 402 each further comprise the input unit 10 and the communication unit 12 (examples of input unit) configured to receive an input from the user. The control unit 8 is configured to execute the height adjustment process based on the initial height level and the target height level (examples of input value) input to the input unit 10 and the communication unit 12.

According to the configuration above, the height adjustment process is executed based on the initial height level and the target height level input by the user to the input unit 10 and the communication unit 12. This also improves the usability of the robotic mower 2, 202, 302, 402 because the height adjustment process can be executed appropriately in accordance with an environment in which the user uses the robotic mower 2, 202, 302, 402 or the work to be performed by the robotic mower 2, 202, 302, 402.

In one or more embodiments, the robotic mowers 2, 202, 302, 402 each comprises the robot body 4, the movement unit 18 configured to move the robot body 4, the blade 46 (the working unit 20) supported by the robot body 4, the height adjustment unit 22 configured to change the height level h of the blade 46 relative to the robot body 4, the input unit 10 and the communication unit 12 (examples of input unit) configured to receive an input from the user, and the control unit 8. The control unit 8 is configured to execute the autonomous operation including the working process of causing the blade 46 to perform the mowing work while moving the robot body 4 by the movement unit 18 (S8, S14, S16 in FIG. 7) (or S38, S40, S42 in FIG. 9) (S208, S218, S220 in FIG. 13) and the height adjustment process of causing the height adjustment unit 22 to adjust the height level h of the blade 46 relative to the robot body 4 in multiple steps (S2, S10, S12, S20, S22, S24, S26 in FIG. 7) (or S20, S210, S212, S214, S216, S224, S226 in FIG. 13). The control unit 8 is configured to execute the height adjustment process based on the initial height level and the target height level (examples of input value) input to the input unit 10 and the communication unit 12.

According to the configuration above, the robotic mower 2, 202, 302, 402 can adjust the height level h of the blade 46 during the autonomous operation by executing the height adjustment process, without a user's manual manipulation. This improves the usability of the robotic mower 2, 202, 302, 402 because the user does not have to monitor the progress of work performed by the robotic mower 2, 202, 302, 402. Further, according to the configuration above, the height adjustment process is executed based on the initial height level and the target height level input by the user to the input unit 10 and the communication unit 12. This also improves the usability of the robotic mower 2, 202, 302, 402 because the height adjustment process can be executed appropriately in accordance with the environment in which the user uses the robotic mower 2, 202, 302, 402 or the work to be performed by the robotic mower 2, 202, 302, 402.

In one or more embodiments, the height adjustment process includes a first height adjustment process of causing the height adjustment unit 22 to set the height level h of the blade 46 relative to the robot body 4 to the initial height level (S2 in FIG. 7) (or S202 in FIG. 13) and a second height adjustment process of causing the height adjustment unit 22 to change the height level h of the blade 46 relative to the robot body 4 from the initial height level to the target height level (S10, S12, S20, S22, S24 in FIG. 7) (or S210, S212, S214, S216, S224 in FIG. 13). The input value includes both the initial height level and the target height level.

Depending on the work performed by the robotic mower 2, 202, 302, 402, it may be desirable to determine, in advance, the height level h of the blade 46 to be achieved shortly after the start of the autonomous operation and the height level h of the blade 46 to be achieved after a while from the start of the autonomous operation. In the configuration above, the height level h of the blade 46 to be achieved shortly after the start of the autonomous operation (the initial height level) and the height level h of the blade 46 to be achieved after a while from the start of the autonomous operation (the target height level) can be determined in advance. This improves the usability of the robotic mower 2, 202, 302, 402.

In one or more embodiments, the control unit 8 is configured to execute S24 in FIG. 7 (or S214 in FIG. 13) several times (an example of executing the second height adjustment process in multiple steps) such that the height level h of the blade 46 relative to the robot body 4 is changed in multiple steps from the initial height level to the target height level. Each time S24 in FIG. 7 (or S214 in FIG. 13) is completed (an example of each time a step included in the multiple steps of the second height adjustment process is completed), the control unit 8 executes the working process until the lawn height uniformity condition (an example of predetermined condition) is satisfied and then start S24 in FIG. 7 (or S214 in FIG. 13) (an example of next step of the second height adjustment process).

Depending on the work performed by the robotic mower 2, 202, 302, 402, it may be desirable to change the height level h of the blade 46 in multiple steps and cause the blade 46 to perform the mowing work each time the height level h of the blade 46 is changed. In the configuration above, the height level h of the blade 46 is changed in multiple steps from the initial height level to the target height level and the blade 46 performs the mowing work each time the height level h of the blade 46 is changed. This improves the usability of the robotic mower 2, 202, 302, 402.

In one or more embodiments, in S24 in FIG. 7 (or in S214 in FIG. 13) (an example of each step of the second height adjustment process), the control unit 8 causes the height adjustment unit 22 to change the height level h of the blade 46 relative to the robot body 4 by a predetermined distance (5 mm).

In the configuration above, the height level h of the blade 46 is changed by the same distance in respective steps of the second height adjustment process. This allows a load on the blade 46 to be maintained constant in the mowing work performed after each time the height level h of the blade 46 is changed.

In one or more embodiments, the control unit 8 is configured to acquire the area of the working region WA (an example of working field area). The lawn height uniformity condition includes the first lawn height uniformity condition (an example of a condition based on the working field area).

According to the configuration above, the lawn height uniformity condition (i.e., a termination condition of the working process executed between steps of the second height adjustment process) is based on the area of the working region WA. Thus, for example, it is possible to terminate the working process within a short period of time if the area of the working region WA is small, or to continue the working process for a long time if the arear of the working region WA is large. Thus, each time the height level h of the blade 46 is changed, the mowing work can be performed by the blade 46 in just the right amount for the area of the working region WA.

In one or more embodiments, the lawn height uniformity condition includes a condition that a duration during which the blade 46 performs the mowing work after a step included in the multiple steps of the second height adjustment process is completed exceeds the first working duration threshold (an example of working duration threshold) determined based on the area of the working region WA.

In the configuration above, it is possible to terminate the working process within a short period of time if the area of the working region WA is small or to continue the working process for a long time if the area of the working region WA is large. Thus, each time the height level h of the blade 46 is changed, the mowing work can be performed by the blade 46 in just the right amount for the area of the working region WA.

In one or more embodiments, the control unit 8 stores the threshold table TT in which a duration threshold is assigned to each of a plurality of area ranges. When the control unit 8 acquires the area of the working region WA, the control unit 8 determines, by referring to the threshold table TT, a duration threshold assigned to the area range in which the area of the working region WA is included as the first working duration threshold.

In the configuration above, the control unit 8 can determine the duration threshold in a simple manner.

In one or more embodiments, the working unit 20 comprises the blade 46 configured to mow the lawn. The target height level is lower than the initial height level. In the second height adjustment process, the control unit 8 causes the height adjustment unit 22 to lower the height level h of the blade 46 relative to the robot body 4 from the initial height level to the target height level.

According to the configuration above, the working robot serves as the robotic mower 2, 202, 302, 402. Pieces of lawn cut off by the robotic mower 2, 202, 302, 402 may be used as a mulching material (i.e., grass mulch) spread over the lawn. Smaller cut pieces of lawn are more effective for growth of the lawn because they decompose sooner. In the configuration above, the robotic mower 2, 202, 302, 402 mows the lawn in multiple steps, and thus the cut pieces of lawn are relatively small in size. Thus, the cut pieces of lawn can effectively enhance the growth of lawn when used as grass mulch.

In one or more embodiments, the input unit includes the input unit 10 (an example of body input unit) disposed in the robot body 4.

It is possible to configure the robotic mower 2, 202, 302, 402 to receive user input only from the communication terminal. However, this may pose inconvenience to the user, if the robotic mower 2, 202, 302, 402 is near the user but the communication terminal is not when the user needs to input some instructions. According to the configuration above, the input unit 10 configured to receive user input is disposed in the robot body 4 of the robotic mower 2, 202, 302, 402. Thus, even when the communication terminal is not near the user, the user can input to the robotic mower 2, 202, 302, 402 as long as the robotic mower 2, 202, 302, 402 is near the user. This prevents the inconvenience to the user.

In one or more embodiments, the robotic mower 2, 202, 302, 402 further comprises the rechargeable battery 30 configured to supply power to the robotic mower 2, 202, 302, 402. The autonomous operation further includes a charging process of causing the robotic mower 2, 202, 302, 402 to return to the charging station 110 to recharge the battery 30 (S16, S18 in FIG. 7) (or S42, S44 in FIG. 9) (S220, S222 in FIG. 13). In the height adjustment process, the control unit 8 causes the height adjustment unit 22 to change the height level h of the blade 46 relative to the robot body 4 when the robotic mower 2, 202, 302, 402 is located at the charging station 110, whereas the control unit 8 does not cause the height adjustment unit 22 to change the height level h of the blade 46 relative to the robot body 4 when the robotic mower 2, 202, 302, 402 is not located at the charging station 110.

There may be obstacles at places other than where the charging station 110 is located. Thus, if the height level h of the blade 46 is changed when the robotic mower 2, 202, 302, 402 is not located at the charging station 110, the blade 46 may bump an obstacle. According to the configuration above, the height level h of the blade 46 is not changed when the robotic mower 2, 202, 302, 402 is not located at the charging station 110, whereas the height level h of the blade 46 is changed only when the robotic mower 2, 202, 302, 402 is located at the charging station 110. This prevents the blade 46 from bumping an obstacle.

What is claimed is:

1. A working robot, comprising:

a robot body;

a movement unit including a movement motor configured to move the robot body;

a working unit including a working motor supported by the robot body;

a height adjustment unit including a height adjustment motor configured to change a height level of the working unit relative to the robot body; and a control unit, wherein the control unit is configured to execute an autonomous operation including:

a working process of causing the working unit to work while moving the robot body by the movement unit, and a height adjustment process of causing the height adjustment unit to adjust the height level of the working unit relative to the robot body in multiple steps;

the working robot is configured to be switched between a first state in which the control unit executes the height adjustment process during the autonomous operation and a second state in which the control unit does not execute the height adjustment process during the autonomous operation;

in the first state, the height adjustment unit changes the height level of the working unit relative to the robot body when a predetermined condition is satisfied; and in the second state, the height adjustment unit does not change the height level of the working unit relative to the robot body even when the predetermined condition is satisfied, such that the height level is kept constant.

2. The working robot according to claim 1, further comprising an input unit including an input interface configured to receive an input from a user, wherein the control unit is configured to execute the height adjustment process based on an input value input to the input unit.

3. A working robot, comprising:

a robot body;

a movement unit including a movement motor configured to move the robot body;

a working unit including a working motor supported by the robot body;

a height adjustment unit including a height adjustment motor configured to change a height level of the working unit relative to the robot body;

an input unit including an input interface configured to receive an input from a user; and a control unit, wherein the control unit is configured to execute an autonomous operation including:

a working process of causing the working unit to work while moving the robot body by the movement unit; and a height adjustment process of causing the height adjustment unit to adjust the height level of the working unit relative to the robot body in multiple steps;

the control unit is configured to execute the height adjustment process based on an input value input to the input unit;

the height adjustment process includes:

a first height adjustment process of causing the height adjustment unit to set the height level of the working unit relative to the robot body to an initial height level, and a second height adjustment process of causing the height adjustment unit to change the height level of the working unit relative to the robot body from the initial height level to a target height level;

the input value includes at least one of the initial height level and the target height level;

the control unit is configured to execute the second height adjustment process in multiple steps such that the height level of the working unit relative to the robot body is changed in multiple steps from the initial height level to the target height level;

each time a step included in the multiple steps of the second height adjustment process is completed, the control unit executes the working process until a predetermined condition is satisfied and then starts a next step of the second height adjustment process;

the control unit is configured to acquire a working field area;

the predetermined condition includes a condition based on the working field area;

the predetermined condition includes a condition that a duration during which the working unit works after a step included in the multiple steps of the second height adjustment process is completed exceeds a working duration threshold determined based on the working field area; and the working duration threshold is set to be higher for larger working field area.

4. The working robot according to claim 2, wherein the height adjustment process includes:

a first height adjustment process of causing the height adjustment unit to set the height level of the working unit relative to the robot body to an initial height level; and a second height adjustment process of causing the height adjustment unit to change the height level of the working unit relative to the robot body from the initial height level to a target height level, and the input value includes at least one of the initial height level and the target height level.

5. The working robot according to claim 4, wherein the control unit is configured to execute the second height adjustment process in multiple steps such that the height level of the working unit relative to the robot body is changed in multiple steps from the initial height level to the target height level, and each time a step included in the multiple steps of the second height adjustment process is completed, the control unit executes the working process until the predetermined condition is satisfied and then starts a next step of the second height adjustment process.

6. The working robot according to claim 5, wherein in each step of the second height adjustment process, the control unit causes the height adjustment unit to change the height level of the working unit relative to the robot body by a predetermined distance.

7. The working robot according to claim 5, wherein the control unit is configured to acquire a working field area, and the predetermined condition includes a condition based on the working field area.

8. The working robot according to claim 7, wherein the predetermined condition includes a condition that a duration during which the working unit works after a step included in the multiple steps of the second height adjustment process is completed exceeds a working duration threshold determined based on the working field area, and the working duration threshold is set to be higher for larger working field area.

9. The working robot according to claim 8, wherein the control unit stores a threshold table in which a duration threshold is assigned to each of a plurality of area ranges, and when the control unit acquires the working field area, the control unit determines, by referring to the threshold table, a duration threshold assigned to the area range in which the working field area is included as the working duration threshold.

10. The working robot according to claim 4, wherein the working unit comprises a blade configured to mow a lawn, the target height level is lower than the initial height level, and in the second height adjustment process, the control unit causes the height adjustment unit to lower the height level of the working unit relative to the robot body from the initial height level to the target height level.

11. The working robot according to claim 2, wherein the input unit includes a body input unit including a body input interface disposed in the robot body.

12. A working robot comprising a robot body:

a movement unit including a movement motor configured to move the robot body;

a working unit including a working motor supported by the robot body:

a height adjustment unit a height adjustment motor configured to change a height level of the working unit relative to the robot body;

a control unit configured to execute an autonomous operation including:

a working process of causing the working unit to work while moving the robot body by the movement unit, and a height adjustment process of causing the height adjustment unit to adjust the height level of the working unit relative to the robot body in multiple steps; and a rechargeable battery configured to supply power to the working robot, wherein the autonomous operation further includes a charging process of causing the working robot to return to a charging station to recharge the battery, and in the height adjustment process, the control unit causes the height adjustment unit to change the height level of the working unit relative to the robot body when the working robot is located at the charging station, whereas the control unit does not cause the height adjustment unit to change the height level of the working unit relative to the robot body when the working robot is not located at the charging station.

13. The working robot according to claim 6, wherein the control unit is configured to acquire a working field area, the predetermined condition includes a condition that a duration during which the working unit works after a step included in the multiple steps of the second height adjustment process is completed exceeds a working duration threshold determined based on the working field area, the working duration threshold is set to be higher for larger working field area, the control unit stores a threshold table in which a duration threshold is assigned to each of a plurality of area ranges, when the control unit acquires the working field area, the control unit determines, by referring to the threshold table, a duration threshold assigned to the area range in which the working field area is included as the working duration threshold, the working unit comprises a blade configured to mow a lawn, the target height level is lower than the initial height level, in the second height adjustment process, the control unit causes the height adjustment unit to lower the height level of the working unit relative to the robot body from the initial height level to the target height level, the input unit includes a body input unit including a body input interface disposed in the robot body, the working robot further comprises a rechargeable battery configured to supply power to the working robot, the autonomous operation further includes a charging process of causing the working robot to return to a charging station to recharge the battery, and in the height adjustment process, the control unit causes the height adjustment unit to change the height level of the working unit relative to the robot body when the working robot is located at the charging station, whereas the control unit does not cause the height adjustment unit to change the height level of the working unit relative to the robot body when the working robot is not located at the charging station.

14. The working robot according to claim 12, further comprising an input unit including an input interface configured to receive an input from a user, wherein the control unit is configured to execute the height adjustment process based on an input value input to the input unit.

15. The working robot according to claim 14, wherein the height adjustment process includes:

a first height adjustment process of causing the height adjustment unit to set the height level of the working unit relative to the robot body to an initial height level, and a second height adjustment process of causing the height adjustment unit to change the height level of the working unit relative to the robot body from the initial height level to a target height level; and the input value includes at least one of the initial height level and the target height level.

16. The working robot according to claim 15, wherein the control unit is configured to execute the second height adjustment process in multiple steps such that the height level of the working unit relative to the robot body is changed in multiple steps from the initial height level to the target height level, and each time a step included in the multiple steps of the second height adjustment process is completed, the control unit executes the working process until a predetermined condition is satisfied and then starts a next step of the second height adjustment process.

17. The working robot according to claim 16, wherein in each step of the second height adjustment process, the control unit causes the height adjustment unit to change the height level of the working unit relative to the robot body by a predetermined distance.

18. The working robot according to claim 16, wherein the control unit is configured to acquire a working field area, and the predetermined condition includes a condition based on the working field area.

19. The working robot according to claim 18, wherein the predetermined condition includes a condition that a duration during which the working unit works after a step included in the multiple steps of the second height adjustment process is completed exceeds a working duration threshold determined based on the working field area, and the working duration threshold is set to be higher for larger working field area.

20. The working robot according to claim 19, wherein the control unit stores a threshold table in which a duration threshold is assigned to each of a plurality of area ranges, and when the control unit acquires the working field area, the control unit determines, by referring to the threshold table, a duration threshold assigned to the area range in which the working field area is included as the working duration threshold.

* * * * *